United States Patent
Yang et al.

(10) Patent No.: US 12,475,599 B2
(45) Date of Patent: Nov. 18, 2025

(54) METHOD AND APPARATUS FOR CALIBRATING EXTRINSIC PARAMETERS OF SURROUND-VIEW CAMERAS ON A VEHICLE, VEHICLE AND STORAGE MEDIA

(71) Applicant: Xuancheng Luxshare Precision Industry Co., Ltd, Xuancheng (CN)

(72) Inventors: Meiying Yang, Xuancheng (CN); Xiaomin Ding, Xuancheng (CN); Baojie Wang, Xuancheng (CN); Di Zhou, Xuancheng (CN); Shoudao Xia, Xuancheng (CN); Fanyou Zhang, Xuancheng (CN); Wenqin Yang, Xuancheng (CN); Yangqiu Cao, Xuancheng (CN)

(73) Assignee: XUANCHENG LUXSHARE PRECISION INDUSTRY CO., LTD, Xuancheng (CN)

( * ) Notice: Subject to any disclaimer, the term of this patent is extended or adjusted under 35 U.S.C. 154(b) by 79 days.

(21) Appl. No.: 18/624,959

(22) Filed: Apr. 2, 2024

(65) Prior Publication Data

US 2024/0331197 A1 Oct. 3, 2024

(30) Foreign Application Priority Data

Apr. 3, 2023 (CN) .......................... 202310364272.9

(51) Int. Cl.
*G06T 7/80* (2017.01)
*H04N 23/90* (2023.01)
(52) U.S. Cl.
CPC .............. *G06T 7/80* (2017.01); *H04N 23/90* (2023.01); *G06T 2207/30252* (2013.01)

(58) Field of Classification Search
CPC ... G06T 7/80; G06T 2207/30252; G06T 7/70; G06T 2207/10016; H04N 23/90; Y02T 10/40
See application file for complete search history.

(56) References Cited

U.S. PATENT DOCUMENTS 9,571,815 B2 * 2/2017 Yang ................... H04N 13/128
2019/0180475 A1 * 6/2019 Nash ....................... G06T 7/80
(Continued)

FOREIGN PATENT DOCUMENTS

| CN | 110675455 A | 1/2020 |
|---|---|---|
| CN | 112330752 A | 2/2021 |

(Continued)

OTHER PUBLICATIONS

Japanese Office Action for Japanese Application No. 2024-059865, dated Feb. 12, 2025, with English translation.

*Primary Examiner* — Hung H Lam
(74) *Attorney, Agent, or Firm* — Birch, Stewart, Kolasch & Birch, LLP

(57) ABSTRACT

A method for calibrating extrinsic parameters of surround-view cameras on a vehicle includes: determining extrinsic parameters of the first camera and the second camera; determining a first pose initial value, a second pose initial value, a third pose initial value, and a fourth pose initial value; determining extrinsic parameters of the third camera and fourth camera according to the extrinsic parameters of the first camera and second camera, the first pose initial value, the second pose initial value, the third pose initial value, and the fourth pose initial value. According to the visual odometer information of the first camera and the second camera, the extrinsic parameters of the first camera and second camera are first determined, and the extrinsic parameters of the third camera and fourth camera are then (Continued)

determined according to the extrinsic parameter of the first camera and the extrinsic parameter of the second camera.

20 Claims, 6 Drawing Sheets

(56) References Cited

U.S. PATENT DOCUMENTS

| | | | | |
|---|---|---|---|---|
| 2021/0312665 A1* | 10/2021 | Deng | ................... | G06F 3/0677 |
| 2021/0334569 A1* | 10/2021 | Fang | ................... | G06V 40/171 |
| 2023/0298204 A1* | 9/2023 | Wang | ....................... | G06T 7/74 |
| | | | | 345/419 |

FOREIGN PATENT DOCUMENTS

| | | |
|---|---|---|
| JP | 2011-87308 A | 4/2011 |
| JP | 2020-60976 A | 4/2020 |

\* cited by examiner

METHOD AND APPARATUS FOR CALIBRATING EXTRINSIC PARAMETERS OF SURROUND-VIEW CAMERAS ON A VEHICLE, VEHICLE AND STORAGE MEDIA

CROSS-REFERENCE TO RELATED APPLICATION

This application claims priority to Chinese Patent Application No. 202310364272.9 filed Apr. 3, 2023, the disclosure of which is incorporated herein by reference in its entirety.

TECHNICAL FIELD

Embodiments of the present disclosure relate to the technical field of autonomous driving, and for example-e, a method and apparatus for calibrating extrinsic parameters of surround-view cameras on a vehicle, a vehicle and a storage media.

BACKGROUND

In an intelligent driving assistance system, calibration of surround-view cameras on a vehicle is the basis of most intelligent sensing functions, so the stability and accuracy of the calibration of the surround-view camera directly affect the accuracy of a visual sensing function. Camera calibration can be divided into intrinsic parameter calibration and extrinsic parameter calibration, where camera intrinsic parameters refer to intrinsic parameters of the camera; and camera extrinsic parameters refer to parameters representing a pose relationship of a camera coordinate system relative to a vehicle-body coordinate system. The vehicle-body coordinate system refers to a coordinate system established by using a vehicle itself as a reference point. The vehicle-body coordinate system can also be considered as a coordinate system used for describing the relative pose relationship between objects around the vehicle and the vehicle. The camera coordinate system refers to a three-dimensional Cartesian angle coordinate system established by taking the focus center of the camera as the origin and the optical axis as the Z-axis.

There are three methods for calibrating the extrinsic parameters of the surround-view cameras on the vehicle. The first is a camera calibration method based on a specific site. This method substantially adopts a specific calibration template placed in a scenario and performs the calibration by extracting feature points of the calibration template. However, this method has a relatively high site-construction cost and can be generally applied only to an environment where the vehicle is still. The second is a camera calibration method based on vanishing points. This method calculates the vanishing points in an image by using parallel information in the environment and then calculates the extrinsic parameters of the camera according to the vanishing points. However, this method relies more on special signs having parallel information, such as lane lines, etc., so the application scenarios are relatively limited. The third is a camera calibration method based on scenario map fusion. This method calculates the relative pose between cameras by map information fusion, where each camera needs to run an odometer to establish an environment map. This method has a high computing power requirement and long-time consumption and is not conducive to real-time online calibration.

SUMMARY

Embodiments of the present disclosure provide a method and apparatus for calibrating extrinsic parameters of surround-view cameras on a vehicle to ensure the timeliness and versatility for calibrating the extrinsic parameters of the surround-view cameras on the vehicle.

According to one aspect of embodiments of the present disclosure, an extrinsic parameter calibration method of surround-view cameras on the vehicle is provided. The method is applied to the vehicle, where the surround-view cameras include a first camera, a second camera, a third camera, and a fourth camera, and where the position of the first camera is adjacent to the position of the third camera and the position of the fourth camera, and the position of the second camera is adjacent to the position of the third camera and the position of the fourth camera. The method includes the steps below.

An extrinsic parameter of the first camera and an extrinsic parameter of the second camera are determined according to vehicle-body odometer information of the vehicle, first visual odometer information of the first camera, and second visual odometer information of the second camera.

A first pose initial value, a second pose initial value, a third pose initial value, and a fourth pose initial value are determined according to the vehicle-body odometer information, the first visual odometer information, the second visual odometer information, the extrinsic parameter of the first camera, and the extrinsic parameter of the second camera.

A first target pose initial value, a second target pose initial value, a third target pose initial value, and a fourth target pose initial value are determined according to the first pose initial value, the second pose initial value, the third pose initial value, and the fourth pose initial value.

An extrinsic parameter of the third camera and an extrinsic parameter of the fourth camera are determined according to the extrinsic parameter of the first camera, the extrinsic parameter of the second camera, the first target pose initial value, the second target pose initial value, the third target pose initial value, and the fourth target pose initial value.

According to another aspect of embodiments of the present disclosure, an apparatus for calibrating extrinsic parameters of surround-view cameras on a vehicle is provided. The apparatus is disposed on the vehicle. The surround-view cameras include a first camera, a second camera, a third camera, and a fourth camera. The position of the first camera is adjacent to the position of the third camera and the position of the fourth camera, and the position of the second camera is adjacent to the position of the third camera and the position of the fourth camera. The apparatus includes a first extrinsic parameter determination module, a pose determination module, an initial value determination module, and a second extrinsic parameter determination module.

The first extrinsic parameter determination module is configured to determine an extrinsic parameter of the first camera and an extrinsic parameter of the second camera according to vehicle-body odometer information of the vehicle, first visual odometer information of the first camera, and second visual odometer information of the second camera.

The pose determination module is configured to determine a first pose initial value, a second pose initial value, a third pose initial value, and a fourth pose initial value according to the vehicle-body odometer information, the first visual odometer information, the second visual odometer information, the extrinsic parameter of the first camera, and the extrinsic parameter of the second camera.

The initial value determination module is configured to determine a first target pose initial value, a second target pose initial value, a third target pose initial value, and a fourth target pose initial value according to the first pose initial value, the second pose initial value, the third pose initial value, and the fourth pose initial value.

The second extrinsic parameter determination module is configured to determine an extrinsic parameter of the third camera and an extrinsic parameter of the fourth camera according to the extrinsic parameter of the first camera, the extrinsic parameter of the second camera, the first target pose initial value, the second target pose initial value, the third target pose initial value, and the fourth target pose initial value.

According to another aspect of embodiments of the present disclosure, a vehicle is provided. The vehicle includes: surround-view cameras; at least one processor; and a memory communicatively connected to the at least one processor, where the surround-view cameras include a first camera, a second camera, a third camera, and a fourth camera, where a position of the first camera is adjacent to a position of the third camera and a position of the fourth camera, and a position of the second camera is adjacent to the position of the third camera and the position of the fourth camera, the memory is configured to store computer programs executable by the at least one processor, and the computer programs, when executed by the at least one processor, enable the at least one processor to execute the method for calibrating extrinsic parameters of surround-view cameras on a vehicle described in any one of the embodiments of the present disclosure.

According to another aspect of embodiments of the present disclosure, a computer-readable storage medium is provided. The computer-readable storage medium is configured to store a computer instruction for causing a processor to, when executed, implement the method for calibrating extrinsic parameters of surround-view cameras on a vehicle described in any one of the embodiments of the present disclosure.

BRIEF DESCRIPTION OF DRAWINGS

To illustrate the solutions in embodiments of the present disclosure more clearly, the drawings used in the description of the embodiments are briefly described below. Apparently, the drawings described below illustrate only part of the embodiments of the present disclosure, and those of ordinary skill in the art may obtain other drawings based on the drawings described below on the premise that no creative work is done.

DETAILED DESCRIPTION

For a better understanding of the solutions of the present disclosure by those skilled in the art, the solutions in embodiments of the present disclosure will be described clearly and completely in conjunction with the drawings in the embodiments of the present disclosure. Apparently, the embodiments described below are part, not all, of the embodiments of the present disclosure. Based on the embodiments of the present disclosure, other embodiments obtained by those of ordinary skill in the art on the premise that no creative work is done are within the scope of the present disclosure.

It is to be noted that the terms "first", "second" and the like in the description, claims and drawings of the present disclosure are used to distinguish between similar objects and are not necessarily used to describe a particular order or sequence. It should be understood that the data used in this way is interchangeable where appropriate so that the embodiment of the present disclosure described herein may also be implemented in a sequence not illustrated or described herein. Additionally, terms "including", "having", or any other variations thereof are intended to encompass a non-exclusive inclusion. For example, a process, method, system, product, or device that includes a series of steps or units may include not only the expressly listed steps or units but also steps or units that are not expressly listed or are inherent to such process, method, system, product, or device.

Embodiment One

Figure 1:
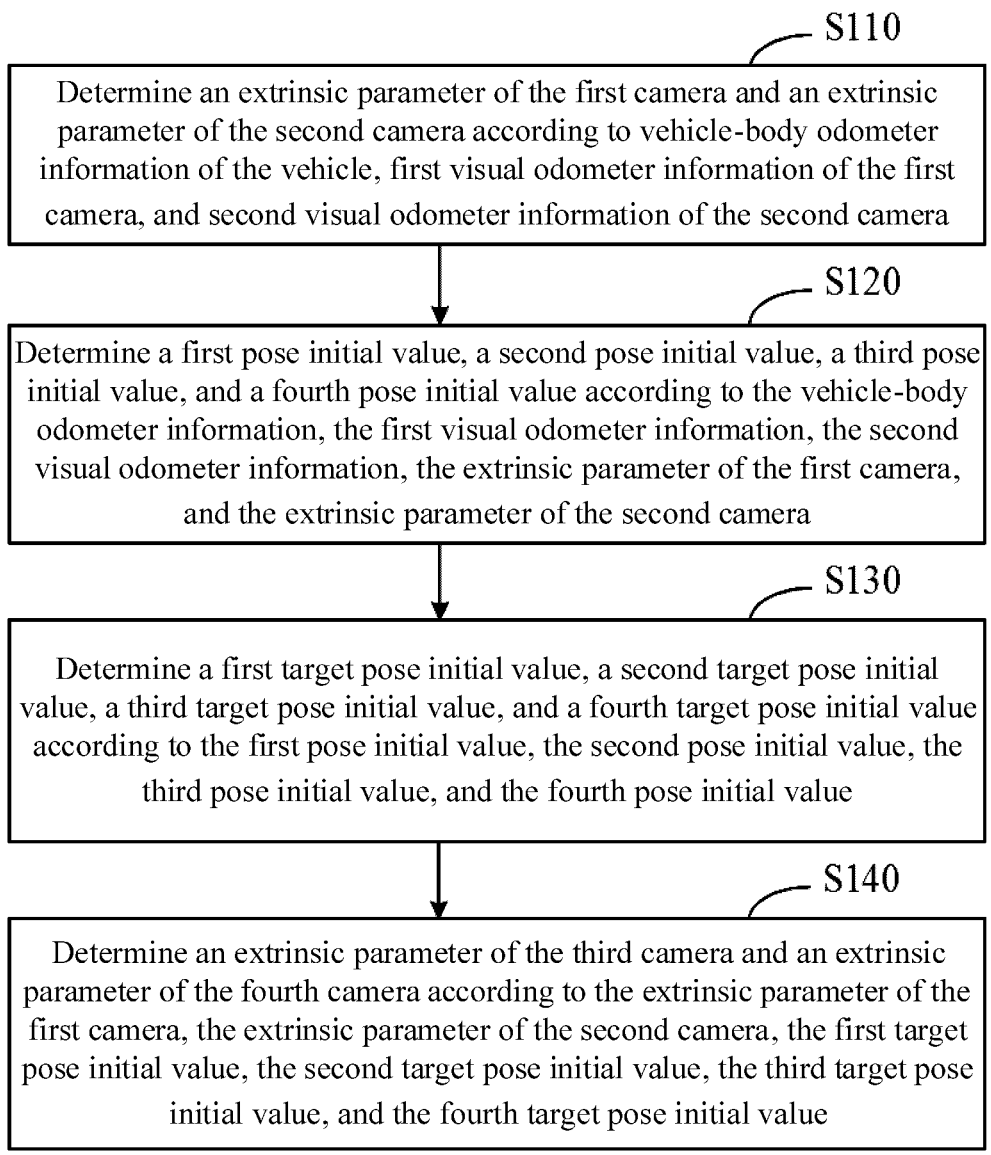
FIG. 1 is a flowchart of a method for calibrating extrinsic parameters of surround-view cameras on a vehicle according to embodiment one of the present disclosure.

FIG. 1 is a flowchart of a method for calibrating extrinsic parameters of surround-view cameras on a vehicle according to embodiment one of the present disclosure. This method is applicable to the case of calibrating the external parameters of the surround-view cameras on the vehicle. This method may be executed by an apparatus for calibrating extrinsic parameters of surround-view cameras on the vehicle. The apparatus may be implemented by software and/or hardware and is generally integrated on a vehicle. The vehicle includes surround-view cameras on the vehicle including a first camera, a second camera, a third camera, and a fourth camera. The position of the first camera is adjacent to the position of the third camera and the position of the fourth camera, and the position of the second camera is adjacent to the position of the third camera and the position of the fourth camera. The position can be understood as the position where the camera is located.

As shown in FIG. 1, a method for calibrating extrinsic parameters of surround-view cameras on a vehicle is provided by embodiment one of the present disclosure. The method includes the steps S110-S140.

In S110: an extrinsic parameter of the first camera and an extrinsic parameter of the second camera are determined according to vehicle-body odometer information of the vehicle, first visual odometer information of the first camera, and second visual odometer information of the second camera.

In this embodiment, the first camera, the second camera, the third camera, and the fourth camera may be understood as cameras for image capturing in directions of a front view, a rear view, a left view, and a right view of the vehicle based on the vehicle body. Herein, the setting of the direction corresponding to each camera is not limited. However, it is ensured that the position of the first camera is adjacent to the position of the third camera and the position of the fourth camera, and the position of the second camera is adjacent to the position of the third camera and the position of the fourth camera. That is, if the first camera is a front-view camera, the third camera may be a left-view camera or a right-view camera adjacent to the position of the front-view camera. Accordingly, if the second camera is a rear-view camera, the fourth camera may be a left-view camera or a right-view camera adjacent to the second camera. It can be understood that, it is needed to ensure that the positions corresponding to the cameras are different. For example, any two of the above four cameras cannot both be left-view cameras.

The first visual odometer information may be considered as visual odometer information corresponding to the first camera. The second visual odometer information may be considered as visual odometer information corresponding to the second camera.

The vehicle-body odometer information may be understood as information associated with a vehicle-body odometer of the vehicle. The vehicle-body odometer may be understood as information representing the change in movement position of the vehicle based on the vehicle body. The visual odometer information is information associated with a visual odometer of the corresponding camera. The visual odometer may be understood as information representing the change in movement position of the camera and map points based on the camera. The specific contents of the vehicle-body odometer information and the visual odometer information are not specifically limited herein. For example, the vehicle-body odometer information may include information such as a vehicle speed, a vehicle-body motion trajectory, and the like. The visual odometer information may include information such as map points, a camera motion trajectory, and the like. The vehicle-body motion trajectory may be understood as information representing the movement trajectory of the vehicle motion. The camera motion trajectory may be understood as information representing the movement trajectory of the camera motion.

How to determine the extrinsic parameter of the first camera and the extrinsic parameter of the second camera according to the vehicle-body odometer information of the vehicle, the first visual odometer information of the first camera, and the second visual odometer information of the second camera is not specifically limited herein. For example, the vehicle-body odometer information may be obtained in a Real-time kinematic (RTK) method, an Inertial Measurement Unit (IMU) method, a wheel speedometer method, and the like. Then, based on the images captured by the first camera and the second camera, the first visual odometer information and the second visual odometer information are obtained in a corresponding visual odometer calculation method. Finally, based on the vehicle-body odometer information, the first visual odometer information, and the second visual odometer information, the extrinsic parameter of the first camera and the extrinsic parameter of the second camera are obtained by corresponding extrinsic parameter algorithms (such as a preset algorithm based on a hand-eye calibration principle).

In S120: a first pose initial value, a second pose initial value, a third pose initial value, and a fourth pose initial value are determined according to the vehicle-body odometer information, the first visual odometer information, the second visual odometer information, the extrinsic parameter of the first camera, and the extrinsic parameter of the second camera.

In this embodiment, the first pose initial value may be understood as an initial value representing the relative pose between the first camera and the third camera. The second pose initial value may be understood as an initial value representing the relative pose between the first camera and the fourth camera. The third pose initial value is an initial value representing the relative pose between the second camera and the third camera. The fourth pose initial value is an initial value representing the relative pose between the second camera and the fourth camera.

How to determine the first pose initial value, the second pose initial value, the third pose initial value, and the fourth pose initial value according to the vehicle-body odometer information, the first visual odometer information, the second visual odometer information, the extrinsic parameter of the first camera, and the extrinsic parameter of the second camera is not specifically limited herein. For example, first, it is possible to, according to the vehicle-body odometer information, map points in the visual odometer information, for example, the first visual odometer information and the second visual odometer information, and image capturing ranges of the above four cameras, determine map points located in the overlapping area between capturing ranges of the first camera and the third camera, map points located in the overlapping area between capturing ranges of the first camera and the fourth camera, map points located in the overlapping area between capturing ranges of the second camera and the third camera, and map points located in the overlapping area between capturing ranges of the second camera and the fourth camera; then, according to the extrinsic parameter of the first camera and the extrinsic parameter of the second camera, first convert the determined map points to points in a camera coordinate system, and then convert to points in a vehicle-body coordinate system on this basis to obtain map points in the vehicle-body coordinate system; according to the map points in the vehicle-body coordinate system and the images captured by the above four cameras, determine an extrinsic parameter initial value corresponding to the third camera and an extrinsic parameter initial value corresponding to the fourth camera by a corresponding extrinsic parameter initial value determination algorithm; and finally, according to the extrinsic parameter of the first camera, the extrinsic parameter of the second camera, the extrinsic parameter initial value corresponding to the third camera, and the extrinsic parameter initial value corresponding to the fourth camera, determine the first pose initial value, the second pose initial value, the third pose initial value, and the fourth pose initial value by a corresponding pose initial value determination algorithm.

In S130: a first target pose initial value, a second target pose initial value, a third target pose initial value, and a fourth target pose initial value are determined according to the first pose initial value, the second pose initial value, the third pose initial value, and the fourth pose initial value.

In this embodiment, the target pose initial values may be understood as the pose initial values used for determining extrinsic parameter of the third camera and extrinsic parameter of the fourth camera. How to determine the first target pose initial value, the second target pose initial value, the third target pose initial value, and the fourth target pose initial value is not specifically limited herein. For example, the first pose initial value, the second pose initial value, the third pose initial value, and the fourth pose initial value may be directly determined as the first target pose initial value, the second target pose initial value, the third target pose initial value, and the fourth target pose initial value, respectively. Alternatively, the first pose initial value, the second pose initial value, the third pose initial value, and the fourth pose initial value may be optimized by a corresponding optimization algorithm to determine the optimized pose initial values as the target pose initial values. That is, the optimized first pose initial value, the optimized second pose initial value, the optimized third pose initial value, and the optimized fourth pose initial value are determined as the first target pose initial value, the second target pose initial value, the third target pose initial value, and the fourth target pose initial value, respectively.

In S140: extrinsic parameter of the third camera and extrinsic parameter of the fourth camera according to the extrinsic parameter of the first camera, the extrinsic parameter of the second camera, the first target pose initial value, the second target pose initial value, the third target pose initial value, and the fourth target pose initial value.

In this embodiment, how to determine the extrinsic parameter of the third camera and the extrinsic parameter of the fourth camera according to the extrinsic parameter of the first camera, the extrinsic parameter of the second camera, the first target pose initial value, the second target pose initial value, the third target pose initial value, and the fourth target pose initial value is not specifically limited. For example, it is possible to obtain the extrinsic parameter of the third camera by a corresponding extrinsic parameter algorithm according to the extrinsic parameter of the first camera and the first target pose initial value, or the extrinsic parameter of the second camera and the fourth target pose initial value. For example, the first camera, the third camera, and the vehicle-body may form a closed-loop relationship, and the extrinsic parameter of the third camera is calculated according to the formula: $T_b^{cl} = T_{cf}^{cl} \cdot T_b^{cf}$, where $T_b^{cl}$ denotes the extrinsic parameter of the third camera, $T_{cf}^{cl}$ denotes the first target pose initial value, and $T_b^{cf}$ denotes the extrinsic parameter of the first camera. It is possible to obtain the extrinsic parameter of the fourth camera by a corresponding extrinsic parameter algorithm according to the extrinsic parameter of the first camera and the second target pose initial value, or the extrinsic parameter of the second camera and the fourth target pose initial value. For example, the second camera, the fourth camera, and the vehicle-body may form a closed-loop relationship, and the extrinsic parameter of the fourth camera is calculated according to the formula: $T_b^{cr} = T_{cre}^{cr} \cdot T_b^{cre}$, where $T_b^{cr}$ denotes the extrinsic parameter of the fourth camera, $T_{cre}^{cr}$ denotes the fourth target pose initial value, and $T_b^{cre}$ denotes the extrinsic parameter of the second camera.

Figure 2:
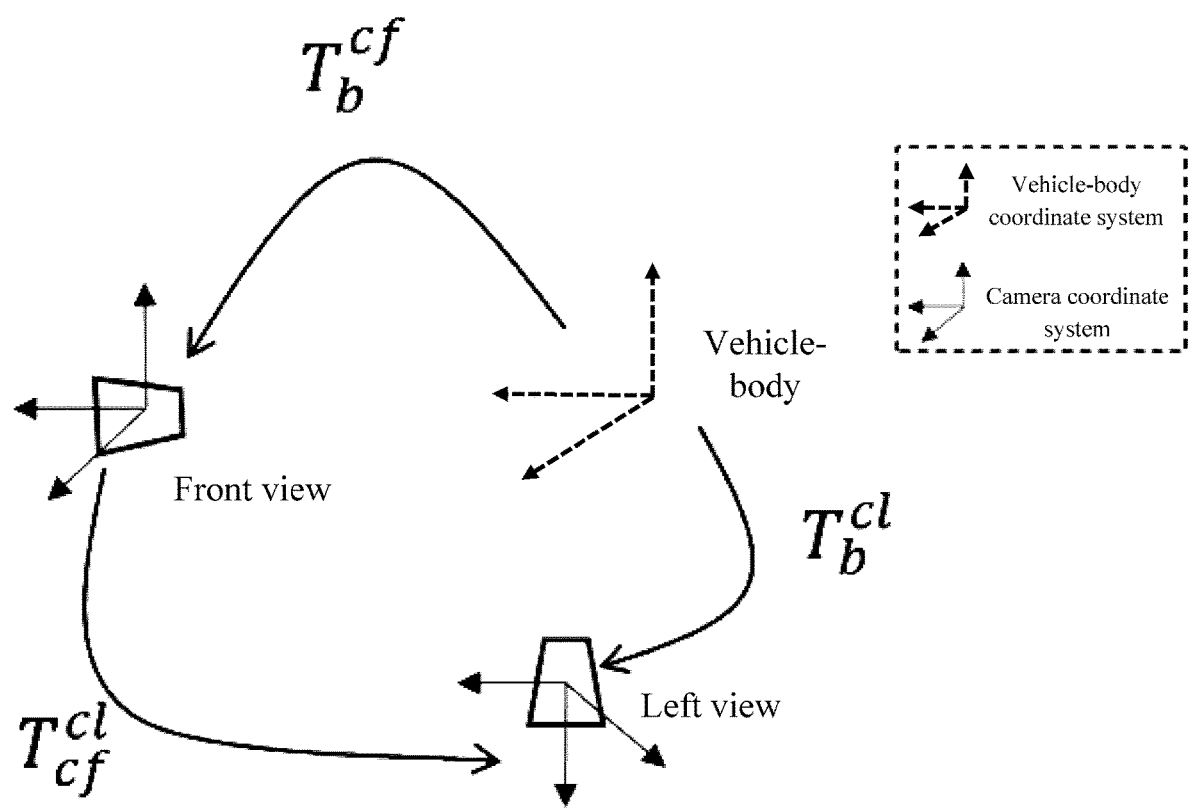
FIG. 2 is an implementation diagram of a closed-loop relationship construction according to embodiment one of the present disclosure.

FIG. 2 is an implementation diagram of a closed-loop relationship construction according to embodiment one of the present disclosure. As shown in FIG. 2, the front-view camera, the left-view camera, and the vehicle-body are used as an example. The front-view camera (i.e. the first camera) and the left-view camera (i.e. the third camera) are located adjacent to each other, and the front-view camera, the left-view camera, and the vehicle-body form a closed-loop relationship.

Figure 3:
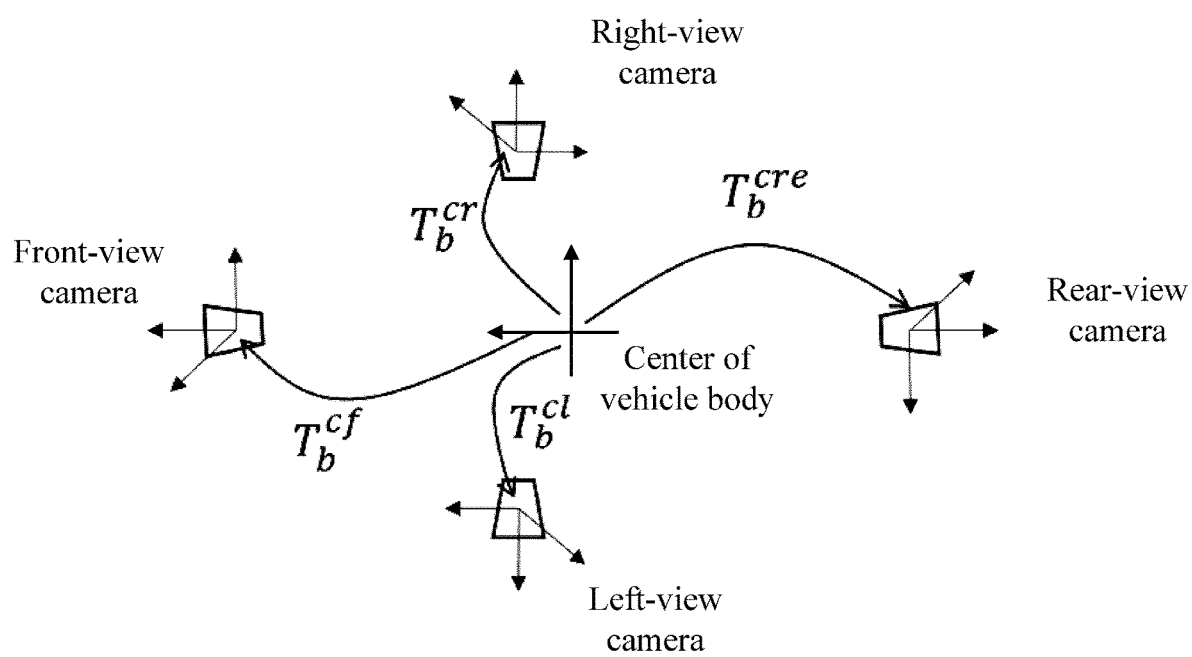
FIG. 3 is an implementation diagram of a four-way camera according to embodiment one of the present disclosure.

FIG. 3 is an implementation diagram of a four-way camera according to embodiment one of the present disclosure. As shown in FIG. 3, the extrinsic parameter of the front-view camera is $T_b^{cf}$. The extrinsic parameter of the rear-view camera is $T_b^{cre}$. The extrinsic parameter of the left-view camera is $T_b^{cl}$. The extrinsic parameter of the right-view camera is $T_c^{cr}$.

In the method for calibrating extrinsic parameters of surround-view cameras on the vehicle provided by embodiment one of the present disclosure, the extrinsic parameter of the first camera and the extrinsic parameter of the second camera are determined according to the vehicle-body odometer information of the vehicle, the first visual odometer information of the first camera, and the second visual odometer information of the second camera. The first pose initial value, the second pose initial value, the third pose initial value, and the fourth pose initial value are determined according to the vehicle-body odometer information, the first visual odometer information, the second visual odometer information, the extrinsic parameter of the first camera, and the extrinsic parameter of the second camera. The first target pose initial value, the second target pose initial value, the third target pose initial value, and the fourth target pose initial value are determined according to the first pose initial value, the second pose initial value, the third pose initial value, and the fourth pose initial value. The extrinsic parameter of the third camera and the extrinsic parameter of the fourth camera are determined according to the extrinsic parameter of the first camera, the extrinsic parameter of the second camera, the first target pose initial value, the second target pose initial value, the third target pose initial value, and the fourth target pose initial value. In the solutions, according to the visual odometer information of the first camera and the second camera, the extrinsic parameter of the first camera and the extrinsic parameter of the second camera are first determined, and the extrinsic parameter of the third camera and the extrinsic parameter of the fourth camera are then determined according to the extrinsic parameter of the first camera and the extrinsic parameter of the second camera, avoiding the problems of large computing power and long-time consumption caused by performing visual odometer calculation to determine the extrinsic parameters by each of the four cameras, thereby improving the timeliness of the extrinsic parameter calibration. Moreover, the solutions can be applied to the extrinsic parameter calibration in any scenario and can avoid the problem of relying on specific road markers, improving the versatility of the extrinsic parameter calibration.

Embodiment Two

Figure 4:
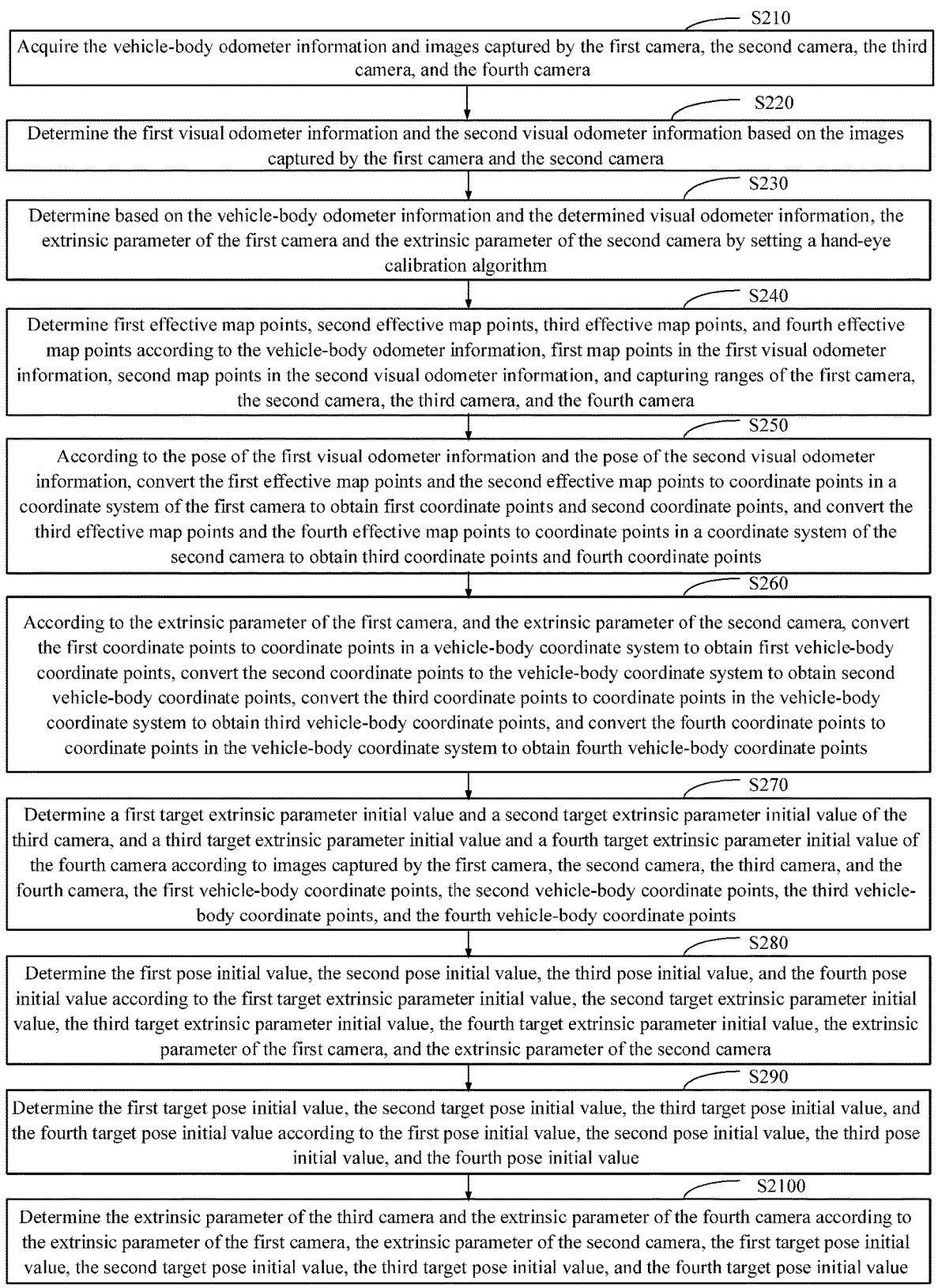
FIG. 4 is a flowchart of a method for calibrating extrinsic parameters of surround-view cameras on a vehicle according to embodiment two of the present disclosure.

FIG. 4 is a flowchart of a method for calibrating extrinsic parameters of surround-view cameras on the vehicle according to embodiment two of the present disclosure. Embodiment two is refined on the basis of the preceding embodiment. In this embodiment, the process of determining the extrinsic parameter of the first camera and the extrinsic parameter of the second camera according to the vehicle-body odometer information of the vehicle, the first visual odometer information of the first camera, and the second visual odometer information of the second camera and the process of determining the first pose initial value, the second pose initial value, the third pose initial value, and the fourth pose initial value according to the vehicle-body odometer information, the first visual odometer information, the second visual odometer information, the extrinsic parameter of the first camera, and the extrinsic parameter of the second camera are described in detail. It is to be noted that, for technical details not described in detail in this embodiment, see any embodiment described above. As shown in FIG. 4, the method includes the steps S210-S2100.

In S210: the vehicle-body odometer information and images captured by the first camera, the second camera, the third camera, and the fourth camera are acquired.

In this embodiment, the vehicle may acquire the vehicle-body odometer information of the vehicle by a corresponding algorithm. The vehicle may acquire the images captured by the cameras (e.g., the above four cameras) in the surround-view cameras.

In S220: the first visual odometer information and the second visual odometer information are determined based on the images captured by the first camera and the second camera.

In this embodiment, the vehicle may obtain the corresponding first visual odometer information by a corresponding algorithm based on the image captured by the first camera. The vehicle may obtain the corresponding second visual odometer information by a corresponding algorithm based on the image captured by the second camera. No limitation thereto is made herein.

In S230: based on the vehicle-body odometer information and the determined visual odometer information, the extrinsic parameter of the first camera and the extrinsic parameter of the second camera are determined by setting a hand-eye calibration algorithm.

In this embodiment, setting the hand-eye calibration algorithm may be understood as a preset extrinsic parameter calculation method based on hand-eye calibration principles. The vehicle may obtain the extrinsic parameter of the first camera by setting the hand-eye calibration algorithm based on the vehicle-body odometer information and the first visual odometer information. The vehicle may obtain the extrinsic parameter of the second camera by setting the hand-eye calibration algorithm based on the vehicle-body odometer information and the second visual odometer information. No limitation thereto is made herein.

In S240: first effective map points, second effective map points, third effective map points, and fourth effective map points are determined according to the vehicle-body odometer information, first map points in the first visual odometer information, second map points in the second visual odometer information, and capturing ranges of the first camera, the second camera, the third camera, and the fourth camera.

In this embodiment, the map points may be understood as three-dimensional points corresponding to image feature points captured by the cameras. Accordingly, the first map points may be understood as map points captured by the first camera. The second map points may be understood as map points captured by the second camera.

The first effective map points are map points in an overlapping area of the first camera and the third camera. The second effective map points are map points in the overlapping area of the first camera and the fourth camera. The third effective map points are map points in the overlapping area of the second camera and the third camera. The fourth effective map points are map points in the overlapping area of the second camera and the fourth camera.

How to determine the first effective map points, the second effective map points, the third effective map points, and the fourth effective map points is not specifically limited herein. For example, first, it is possible to determine a scale factor according to the vehicle-body odometer information and the visual odometer information so that a ratio conversion is performed on the first map points and the second map points based on the scale factor to obtain first real map points and second real map points in a real-world map corresponding to the scale factor. For example, a first scale factor is determined according to the vehicle-body odometer information and the first visual odometer information, and a second scale factor is determined according to the vehicle-body odometer information and the second visual odometer information. A ratio conversion is performed on the first map points based on the first scale factor to obtain first real map points in the real-world map. A ratio conversion is performed on the second map points based on the second scale factor to obtain second real map points in the real-world map. Then, it is possible to determine an overlapping area (i.e. a first overlapping area) of the first camera and the third camera, an overlapping area (i.e. a second overlapping area) of the first camera and the fourth camera, an overlapping area (i.e. a third overlapping area) of the second camera and the third camera, and an overlapping area (i.e. a fourth overlapping area) of the second camera and the fourth camera. Finally, it is possible to determine map points of the first real map points in the first overlapping area as the first effective map points, determine map points of the first real map points in the second overlapping area as the second effective map points, determine map points of the second real map points in the third overlapping area as the third effective map points, and determine map points of the second real map points in the fourth overlapping area as the fourth effective map points.

In S250: according to a pose of the first visual odometer information and a pose of the second visual odometer information, the first effective map points and the second effective map points are converted to coordinate points in a coordinate system of the first camera to obtain first coordinate points and second coordinate points, and the third effective map points and the fourth effective map points are converted to coordinate points in a coordinate system of the second camera to obtain third coordinate points and fourth coordinate points.

In this embodiment, the first coordinate points may be understood as coordinate points obtained by converting the first effective map points to points in the coordinate system of the first camera. The second coordinate points may be understood as coordinate points obtained by converting the second effective map points to points in the coordinate system of the first camera. The third coordinate points may be understood as coordinate points obtained by converting the third effective map points to points in the coordinate system of the second camera. The fourth coordinate points may be understood as coordinate points obtained by converting the fourth effective map points to points in the coordinate system of the second camera.

In S260: according to the extrinsic parameter of the first camera, and the extrinsic parameter of the second camera, the first coordinate points is converted to coordinate points in a vehicle-body coordinate system to obtain first vehicle-body coordinate points, the second coordinate points is converted to coordinate points in the vehicle-body coordinate system to obtain second vehicle-body coordinate points, the third coordinate points is converted to coordinate points in the vehicle-body coordinate system to obtain third vehicle-body coordinate points, and the fourth coordinate points is converted to coordinate points in the vehicle-body coordinate system to obtain fourth vehicle-body coordinate points.

In this embodiment, the first vehicle-body coordinate points may be understood as points in the vehicle-body coordinate system converted from the first effective map points. The second vehicle-body coordinate points may be understood as points in the vehicle-body coordinate system converted from the second effective map points. The third vehicle-body coordinate points may be understood as points in the vehicle-body coordinate system converted from the third effective map points. The fourth vehicle-body coordinate points may be understood as points in the vehicle-body coordinate system converted from the fourth effective map points.

The extrinsic parameter of the first camera represents a pose relationship of the vehicle-body coordinate system relative to the coordinate system of the first camera. The extrinsic parameter of the first camera is inverted to obtain a pose relationship of the coordinate system of the first camera relative to the vehicle-body coordinate system. On this basis, it is possible to, based on the pose relationship of the coordinate system of the first camera relative to the vehicle-body coordinate system, convert the first coordinate points to points in the vehicle-body coordinate system, i.e. the first vehicle-body coordinate points, and convert the second coordinate points to points in the vehicle-body coordinate system, i.e. the second vehicle-body coordinate points. Accordingly, the extrinsic parameter of the second camera represents a pose relationship of the vehicle-body coordinate system relative to the coordinate system of the second camera. The extrinsic parameter of the second camera is inverted to obtain a pose relationship of the coordinate system of the second camera relative to the vehicle-body coordinate system. On this basis, it is possible to, based on the pose relationship of the coordinate system of the second camera relative to the vehicle-body coordinate system, convert the third coordinate points to points in the vehicle-body coordinate system, i.e. the third vehicle-body coordinate points, and convert the fourth coordinate points to points in the vehicle-body coordinate system, i.e. the fourth vehicle-body coordinate points.

In S270: a first target extrinsic parameter initial value and a second target extrinsic parameter initial value of the third camera, and a third target extrinsic parameter initial value and a fourth target extrinsic parameter initial value of the fourth camera are determined according to images captured by the first camera, the second camera, the third camera, and the fourth camera, the first vehicle-body coordinate points, the second vehicle-body coordinate points, the third vehicle-body coordinate points, and the fourth vehicle-body coordinate points.

In this embodiment, the first target extrinsic parameter initial value and the second target extrinsic parameter initial value may be understood as an optimized first extrinsic parameter initial value and an optimized second extrinsic parameter initial value. A first extrinsic parameter initial value and a second extrinsic parameter initial value may be understood as two initial values representing the extrinsic parameter of the third camera. The third target extrinsic parameter initial value and the fourth target extrinsic parameter initial value may be understood as an optimized third extrinsic parameter initial value and an optimized fourth extrinsic parameter initial value. A third extrinsic parameter initial value and a fourth extrinsic parameter initial value may be understood as two initial values representing the extrinsic parameter of the fourth camera.

How to determine the target extrinsic parameter initial values is not specifically limited herein. For example, first, it is possible to perform image processing on the images captured by the above four cameras by corresponding algorithms to extract corresponding feature points of the first vehicle-body coordinate points on an image of the third camera and obtained by feature point matching by the first camera and the third camera, corresponding feature points of the second vehicle-body coordinate points on an image of the fourth camera and obtained by feature point matching by the first camera and the fourth camera, corresponding feature points of the third vehicle-body coordinate points on the image of the third camera and obtained by feature point matching by the second camera and the third camera, and corresponding feature points of the fourth vehicle-body coordinate points on the image of the fourth camera and obtained by feature point matching by the second camera and the fourth camera. The feature points can represent pixels with significant features. Then, it is possible to determine the initial extrinsic parameter of the third camera and the initial extrinsic parameter of the fourth camera by a corresponding algorithm according to the extracted feature points and the determined vehicle-body coordinate points. Finally, it is possible to optimize the initial extrinsic parameter of the third camera and the initial extrinsic parameter of the fourth camera by a preset optimization algorithm to obtain the first target extrinsic parameter initial value and the second target extrinsic parameter initial value of the third camera, and the third target extrinsic parameter initial value and the fourth target extrinsic parameter initial value of the fourth camera.

In S280: the first pose initial value, the second pose initial value, the third pose initial value, and the fourth pose initial value are determined according to the first target extrinsic parameter initial value, the second target extrinsic parameter initial value, the third target extrinsic parameter initial value, the fourth target extrinsic parameter initial value, the extrinsic parameter of the first camera, and the extrinsic parameter of the second camera.

In this embodiment, first, it is possible to obtain the first pose initial value, the second pose initial value, the third pose initial value, and the fourth pose initial value by a corresponding algorithm according to the first target extrinsic parameter initial value, the second target extrinsic parameter initial value, the third target extrinsic parameter initial value, the fourth target extrinsic parameter initial value, the extrinsic parameter of the first camera, and the extrinsic parameter of the second camera.

In S290: the first target pose initial value, the second target pose initial value, the third target pose initial value, and the fourth target pose initial value are determined according to the first pose initial value, the second pose initial value, the third pose initial value, and the fourth pose initial value.

In S2100: the extrinsic parameter of the third camera and the extrinsic parameter of the fourth camera are determined according to the extrinsic parameter of the first camera, the extrinsic parameter of the second camera, the first target pose initial value, the second target pose initial value, the third target pose initial value, and the fourth target pose initial value.

The method for calibrating extrinsic parameters of surround-view cameras on a vehicle provided by embodiment two of the present disclosure specifies the process of determining the extrinsic parameter of the first camera and the extrinsic parameter of the second camera according to the vehicle-body odometer information of the vehicle, the first visual odometer information of the first camera, and the second visual odometer information of the second camera, and the process of determining the first pose initial value, the second pose initial value, the third pose initial value, and the fourth pose initial value according to the vehicle-body odometer information, the first visual odometer information, the second visual odometer information, the extrinsic parameter of the first camera, and the extrinsic parameter of the second camera. In this method, it is possible to, first determine the extrinsic parameters of two cameras to then determine the extrinsic parameters of the other two cameras so that the problems of large computing power and long-time consumption caused by performing, by each of the above four cameras, visual odometer calculation to determine the external parameters can be avoided, effectively improving the efficiency of the extrinsic parameter calibration, and ensuring the real-time performance of the extrinsic parameter calibration.

In an embodiment, the step in which the first effective map points, the second effective map points, the third effective map points, and the fourth effective map points are determined according to the vehicle-body odometer information, the first map points in the first visual odometer information, the second map points in the second visual odometer information, and the capturing ranges of the first camera, the second camera, the third camera, and the fourth camera includes the steps below.

The scale factor is determined based on vehicle-body motion trajectory information in the vehicle-body odometer information and camera motion trajectory information in the determined visual odometer information. The scale factor is a parameter representing a ratio of a real-world scale to a scale of a camera-constructed three-dimensional map.

The ratio conversion is performed on the first map points and the second map points based on the scale factor to obtain the first real map points of the first map points at the real-world scale and the second real map points of the second map points at the real-world map scale. For example, a first scale factor is determined based on vehicle-body motion trajectory information in the vehicle-body odometer information and camera motion trajectory information in the first visual odometer information. A second scale factor is determined based on vehicle-body motion trajectory information in the vehicle-body odometer information and camera motion trajectory information in the second visual odometer information. A ratio conversion is performed on the first map points based on the first scale factor to obtain the first real map points of the first map points at the real-world scale; and a ratio conversion is performed on the second map points based on the second scale factor to obtain the second real map points of the second map points at the real-world map scale.

The first overlapping area, the second overlapping area, the third overlapping area, and the fourth overlapping area are determined according to the capturing ranges of the first camera, the second camera, the third camera, and the fourth camera. The first overlapping area is the overlapping area between capturing ranges of the first camera and the third camera, the second overlapping area is the overlapping area between capturing ranges of the first camera and the fourth camera, the third overlapping area is the overlapping area between capturing ranges of the second camera and the third camera, and the fourth overlapping area is the overlapping area between capturing ranges of the second camera and the fourth camera.

The map points of the first real map points in the first overlapping area are determined as the first effective map points. The map points of the first real map points in the second overlapping area are determined as the second effective map points. The map points of the second real map points in the third overlapping area are determined as the third effective map points. The map points of the second real map points in the fourth overlapping area are determined as the fourth effective map points.

In this embodiment, the real-world scale may be understood as a scale in the real world. The scale of the camera-constructed three-dimensional map may be understood as a scale of constructing a three-dimensional map. The vehicle-body motion trajectory information may be understood as information representing a vehicle-body motion trajectory. The camera motion trajectory information may be understood as information representing a camera motion trajectory. The vehicle may obtain a corresponding scale factor by a corresponding algorithm based on the vehicle-body motion trajectory information in the vehicle-body odometer information and the camera motion trajectory information in the determined visual odometer information.

In an embodiment, the step in which the first target extrinsic parameter initial value and the second target extrinsic parameter initial value of the third camera, and the third target extrinsic parameter initial value and the fourth target extrinsic parameter initial value of the fourth camera are determined according to the images captured by the first camera, the second camera, the third camera, and the fourth camera, the first vehicle-body coordinate points, the second vehicle-body coordinate points, the third vehicle-body coordinate points, and the fourth vehicle-body coordinate points includes the steps below.

The first target feature points, the second target feature points, the third target feature points and the fourth target feature points are determined according to the images captured by the first camera, the second camera, the third camera, and the fourth camera. The first target feature points are corresponding feature points of the first vehicle-body coordinate points on the image of the third camera and obtained by feature point matching by the first camera and the third camera, the second target feature points are corresponding feature points of the second vehicle-body coordinate points on the image of the fourth camera and obtained by feature point matching by the first camera and the fourth camera, the third target feature points are corresponding feature points of the third vehicle-body coordinate points on the image of the third camera and obtained by feature point matching by the second camera and the third camera, and the fourth target feature points are corresponding feature points of the fourth vehicle-body coordinate points on the image of the fourth camera and obtained by feature point matching by the second camera and the fourth camera.

In this embodiment, how to determine the first target feature points, the second target feature points, the third target feature points, and the fourth target feature points according to the images captured by the above four cameras is not specifically limited. Feature points of the first camera represent two-dimensional feature points corresponding to map points in the first visual odometer information. Feature points of the second camera represent two-dimensional feature points corresponding to map points in the second visual odometer information. Feature points of the first camera are matched feature points of the third camera and feature points of the fourth camera by a feature matching algorithm to determine first target feature points and second target feature points. The feature points of the second camera are matched the feature points of the third camera and the feature points of the fourth camera by the feature matching algorithm to determine third target feature points and fourth target feature points. The feature matching algorithm is not specifically limited herein.

The first extrinsic parameter initial value and the second extrinsic parameter initial value of the third camera, and the third extrinsic parameter initial value and the fourth extrinsic parameter initial value of the fourth camera are determined by a Perspective-n-Point (PNP) method according to the vehicle-body coordinate points (e.g., the first vehicle-body coordinate points, the second vehicle-body coordinate points, the third vehicle-body coordinate points, and the fourth vehicle-body coordinate points) and the target feature points (e.g., the first target feature points, the second target feature points, the third target feature points, and the fourth target feature points).

In this embodiment, an extrinsic parameter initial value may be understood as initial value of the extrinsic parameter. How to determine the extrinsic parameter initial value of the third camera and the extrinsic parameter initial value of the fourth camera according to the vehicle-body coordinate points and the target feature points is not specifically limited herein. For example, utilizing the PNP method, the first extrinsic parameter initial value of the third camera may be obtained based on the first vehicle-body coordinate points and the first target feature points, the second extrinsic parameter initial value of the third camera may be obtained based on the second vehicle-body coordinate points and the second target feature points, the third extrinsic parameter initial value of the fourth camera may be obtained based on the third vehicle-body coordinate points and the third target feature points, and the fourth extrinsic parameter initial value of the fourth camera may be obtained based on the fourth vehicle-body coordinate points and the fourth target feature points.

For each camera of the third camera and the fourth camera, for each value in a set area of the each camera, an extrinsic parameter initial value of the each camera is updated to the each value, vehicle-body coordinate points corresponding to the each camera are projected onto an image coordinate system of the each camera to obtain two-dimensional coordinate points corresponding to the each camera, and a photometric error between target feature points and the two-dimensional coordinate points corresponding to the each camera is determined. The set area is associated with the extrinsic parameter initial value of a camera corresponding to the set area.

In this embodiment, the set area is associated with the extrinsic parameter initial value of the corresponding camera and is not limited herein. For example, the set area may be a set range determined by the extrinsic parameter initial value as an intermediate value, or may be a set range determined by the extrinsic parameter initial value as a left interval endpoint. The image coordinate system may be understood as a coordinate system established by taking the center of the image plane as the origin of the coordinate, the X-axis and the Y-axis are parallel to two vertical edges of the image plane, respectively. The image coordinate system may be considered as a coordinate system that represents positions of pixels in an image in physical units (e.g. millimeters). The photometric error may be understood as a difference between a photometric value of the two-dimensional coordinate points and a photometric value of the target feature points. Each value within the set area may correspond to one photometric error.

In photometric errors corresponding to a camera, the value corresponding to the minimum photometric error is determined as the target extrinsic parameter initial value corresponding to the camera.

In this embodiment, the minimum photometric error may be understood as a photometric error having a minimum value.

In an embodiment, the first target pose initial value, the second target pose initial value, the third target pose initial value, and the fourth target pose initial value are determined according to the first pose initial value, the second pose initial value, the third pose initial value, and the fourth pose initial value includes the step below.

The first pose initial value, the second pose initial value, the third pose initial value, and the fourth pose initial value are determined as the first target pose initial value, the second target pose initial value, the third target pose initial value, and the fourth target pose initial value.

In an embodiment, the first target pose initial value, the second target pose initial value, the third target pose initial value, and the fourth target pose initial value are determined according to the first pose initial value, the second pose initial value, the third pose initial value, and the fourth pose initial value includes the step below.

If a first photometric error value under the first pose initial value, a second photometric error value under the second pose initial value, a third photometric error value under the third pose initial value, and a fourth photometric error value under the fourth pose initial value do not satisfy a first set condition, the pose initial values (e.g., the first pose initial value, the second pose initial value, the third pose initial value, and the fourth pose initial value) are updated based on a first setting step size until the photometric error values under the updated pose initial values (e.g., the first photometric error value under the first pose initial value, a second photometric error value under the second pose initial value, a third photometric error value under the third pose initial value, and a fourth photometric error value under the fourth pose initial value) satisfy the first set condition, and the updated pose initial values are determined as the target pose initial values. That is, the updated first pose initial value, the updated second pose initial value, the updated third pose initial value, and the updated fourth pose initial value are determined as the first target pose initial value, the second target pose initial value, the third target pose initial value and the fourth target pose initial value, respectively.

The first photometric error value is an error value between a photometric value of first projection points and a photometric value of the first target feature points. The first projection points are points obtained by projecting, under the first pose initial value, the first effective map points of the first camera to the image coordinate system of the third camera.

The second photometric error value is an error value between a photometric value of second projection points and a photometric value of the second target feature points. The second projection points are points obtained by projecting, under the second pose initial value, the second effective map points of the first camera to the image coordinate system of the fourth camera.

The third photometric error value is an error value between a photometric value of third projection points and a photometric value of the third target feature points. The third projection points are points obtained by projecting, under the third pose initial value, the third effective map points of the second camera to the image coordinate system of the third camera.

The fourth photometric error value is an error value between a photometric value of fourth projection points and a photometric value of the fourth target feature points. The fourth projection points are points obtained by projecting, under the fourth pose initial value, the fourth effective map points of the second camera to the image coordinate system of the fourth camera.

The first set condition is that the first photometric error value reaches a first threshold, the second photometric error value reaches a second threshold, the third photometric error value reaches a third threshold, and the fourth photometric error value reaches a fourth threshold.

In this embodiment, the vehicle may obtain the first pose initial value by setting a pose algorithm according to the extrinsic parameter of the first camera and the target extrinsic parameter initial value of the third camera and obtain the second pose initial value by setting a pose algorithm according to the extrinsic parameter of the first camera and the target extrinsic parameter initial value of the fourth camera. Accordingly, the vehicle may obtain the third pose initial value by setting a pose algorithm according to the extrinsic parameter of the second camera and the target extrinsic parameter initial value of the third camera and obtain the fourth pose initial value by setting a pose algorithm according to the extrinsic parameter of the second camera and the target extrinsic parameter initial value of the fourth camera.

In this embodiment, the first threshold may be understood as a preset first threshold, the second threshold may be understood as a preset second threshold, the third threshold may be understood as a preset third threshold, and the fourth threshold may be understood as a preset fourth threshold. The first threshold, the second threshold, the third threshold, and the fourth threshold are not specifically limited herein. That the first photometric error value reaches the first threshold may be considered as the first photometric error value less than or equal to the first threshold. Accordingly, that the second photometric error value reaches the second threshold may be considered as the second photometric error value less than or equal to the second threshold. That the third photometric error value reaches the third threshold may be considered as the third photometric error value less than or equal to the third threshold. That the fourth photometric error value reaches the fourth threshold may be considered as the fourth photometric error value less than or equal to the fourth threshold.

The first setting step size may be understood as a preset step size and is not limited herein. How to update the first pose initial value, the second pose initial value, the third pose initial value, and/or the fourth pose initial value based on the first setting step size is not specifically limited herein. For example, it is possible to increase the first pose initial value, the second pose initial value, the third pose initial value, and/or the fourth pose initial value by a first setting step size, or decrease the first pose initial value, the second pose initial value, the third pose initial value, and/or the fourth pose initial value by a first setting step size. It is to be understood that after the first pose initial value is updated, the relative pose between the first camera and the third camera changes, and the corresponding first photometric error changes; and accordingly, after the second pose initial value is updated, the relative pose between the first camera and the fourth camera changes, the corresponding second photometric error changes, and so on.

In an embodiment, after the extrinsic parameter of the third camera and the extrinsic parameter of the fourth camera are determined, the method also includes: under the extrinsic parameters of the above four cameras, determining an error index according to the following formula: $E_{rr}=E_1+E_2+E_3+E_4+E_5+E_6$.

$E_{rr}$ denotes the error index that is a parameter index for measuring the optimization of the extrinsic parameters of the four cameras. $E_1$ denotes a re-projection error value of first effective map points, of the first camera, projected onto the image coordinate system of the third camera. $E_2$ denotes a re-projection error value of third effective map points, of the second camera, projected onto the image coordinate system of the third camera. $E_3$ denotes a re-projection error value of second effective map points, of the first camera, projected onto the image coordinate system of the fourth camera. $E_4$ denotes a re-projection error value of fourth effective map points, of the second camera, projected onto the image coordinate system of the fourth camera. $E_5$ denotes a hand-eye calibration error value determined based on the vehicle-body odometer information and the first visual odometer information of the first camera. $E_6$ denotes a hand-eye calibration error value determined based on the vehicle-body odometer information and the second visual odometer information of the second camera.

In this embodiment, the re-projection error values may be understood as a pixel difference between points projected from effective map points in the camera coordinate system to the image coordinate system and real points in the image coordinate system. The hand-eye calibration error value may be understood as an odometer error value between the vehicle-body odometer and the visual odometer calculated based on a hand-eye calibration principle.

In one embodiment, optimization objective is:

$$\arg\min_{\xi}(E_{rr})$$

where $\xi=\{\xi_b^{cf}, \xi_b^{cre}, \xi_b^{cl}, \xi_b^{cr}\}$; and $\xi_b^{cf}=\ln(T_b^{cf})^v$, and $\xi_b^{cf}$ is a representation of Lie algebra of $T_b^{cf}$. It goes the same to $\xi_b^{cre}, \xi_b^{cl}$, and $\xi_b^{cr}$. That is, $\xi_b^{cre}=\ln(T_b^{cre})^v$, and $\xi_b^{cl}$ is a representation of Lie algebra of $\ln(T_b^{cl})^v$; $\xi_b^{cl}=\ln(T_b^{cl})^v$, and $\xi_b^{cl}$ is a representation of Lie algebra of $T_b^{cl}$; $\xi_b^{cr}=\ln(T_b^{cr})^v$, and $\xi_b^{cr}$ is a representation of Lie algebra of $T_b^{cr}$; and v denotes from matrix to vector. The optimization objective may be solved in a method such as gradient descent, gauss-newton iteration, a trust region, or the like. The extrinsic parameter of each camera is optimized based on the optimization objective, and how to optimize is not specifically limited herein.

In one embodiment, $$E_1 = W_1 \sum_{i=1}^{n} \left\| w_{fl} \cdot \left(I_1\left(A_l \cdot T_b^{cl} \cdot (T_b^{cf})^{-1} \cdot P_{f,i}\right) - I_2(u_{f,i})\right) \right\|_2^2;$$

$$E_2 = W_2 \sum_{i=1}^{m} \left\| w_{rl} \cdot \left(I_1\left(A_l \cdot T_b^{cl} \cdot (T_b^{cre})^{-1} \cdot P_{re,i}\right) - I_2(u_{re,i})\right) \right\|_2^2;$$

$$E_3 = W_3 \sum_{i=1}^{l} \left\| w_{fr} \cdot \left(I_1\left(A_r \cdot T_b^{cr} \cdot (T_b^{cf})^{-1} \cdot P_{f,i}\right) - I_2(u_{f,i})\right) \right\|_2^2;$$

$$E_4 = W_4 \sum_{i=1}^{k} \left\| w_{rr} \cdot \left(I_1\left(A_r \cdot T_b^{cr} \cdot (T_b^{cre})^{-1} \cdot P_{re,i}\right) - I_2(u_{re,i})\right) \right\|_2^2;$$

$$E_5 = W_5 \sum_{i=0}^{h} \left\| d\left(T_{c_i}^{c_{i+1}} \cdot T_b^{cf}, T_b^{cf} \cdot T_{b_i}^{b_{i+1}}\right) \right\|_2^2;$$

and $$E_6 = W_6 \sum_{i=0}^{s} \left\| d\left(T_{c_i}^{c_{i+1}} \cdot T_b^{cre}, T_b^{cre} \cdot T_{b_i}^{b_{i+1}}\right) \right\|_2^2.$$

$T_b^{cf}, T_b^{cre}, T_b^{cl}, T_b^{cr}$ denote the extrinsic parameter of the front-view camera the rear-view camera, the left-view camera, and the right-view camera, respectively.

The case where the first camera, the second camera, the third camera, and the fourth camera are the front-view camera, the rear-view camera, the left-view camera, and the right-view camera, respectively is taken as an example for illustration.

$$T_b^{cf} = \begin{bmatrix} R_b^{cf} & t_b^{cf} \\ 0^T & 1 \end{bmatrix} \in \mathbb{R}^{4\times 4}, R_b^{cf} \in SO(3), t_b^{cf} \in \mathbb{R}^3$$

$I_1(\ )$ and $I_2(\ )$ each denotes a gray value (or a photometric value) of an image feature point. $A_l$ and $A_r$ denote intrinsic matrixes of the left-view camera and the right-view camera, respectively. $d(\ )$ denotes a distance measure on an Euclidean algebra. $P_{f,i}$ and $P_{re,i}$ denote a three-dimensional map point of the front-view camera and the rear-view camera, respectively. $u_{f,i}$ and $u_{re,i}$ denote an image feature point of the front-view camera and an image feature point of the rear-view camera, respectively. $T_{b_i}^{b_{i+1}}$ denotes a pose relationship of adjacent image frames in the vehicle-body coordinate system. $T_{c_j}^{c_{j+1}}$ denotes a pose relationship of adjacent image frames in the camera coordinate system. $w_{fl}$, $w_{rl}$, $w_{fr}$, $w_{rr}$, and $W_{1, 2, 3, 4, 5, 6}$ denote preset weights, respectively.

If the error index reaches an error threshold, the extrinsic parameter of the each camera is determined as the target extrinsic parameter of the each camera. The target extrinsic parameter is an optimized extrinsic parameter.

If the error index does not reach the error threshold, the extrinsic parameter of at least one of the first camera, the second camera, the third camera, or the fourth camera is updated based on a second setting step size until the error index reaches the error threshold, and the extrinsic parameters of the first camera, the second camera, the third camera, and the fourth camera are determined as the target extrinsic parameters of the first camera, the second camera, the third camera, and the fourth camera when the error index reaches the error threshold. That is, when the error index reaches the error threshold, the extrinsic parameters of the first camera, the second camera, the third camera, and the fourth camera are determined as the target extrinsic parameters of the first camera, the second camera, the third camera, and the fourth camera, respectively.

In this embodiment, the error threshold may be understood as a preset threshold for measuring the error index and is not specifically limited herein. The second setting step size may be understood as a preset second step size and is not specifically limited herein.

How to update the extrinsic parameter of at least one of the first camera, the second camera, the third camera, or the fourth camera is based on the second setting step size is not specifically limited herein. For example, the extrinsic parameter of at least one of the first camera, the second camera, the third camera, or the fourth camera may be increased or decreased by the second setting step size to obtain new extrinsic parameter.

In this embodiment, after the extrinsic parameter initial values of the four cameras are calculated, a joint optimization is performed on the extrinsic parameter initial values of the four cameras, improving the extrinsic parameter calibration accuracy.

In an embodiment, after the target extrinsic parameters of the four cameras are determined, the method also includes the steps below.

For each of the four cameras, Euler angle information and translation vector information of the each of the four cameras are determined based on the target extrinsic parameter of the each of the four cameras. The Euler angle information is information representing the rotation angle of the each of the four cameras relative to the vehicle-body coordinate system. The translation vector information is information representing the amount of translation of the each of the four cameras relative to the vehicle-body coordinate system.

Whether the Euler angle information and the translation vector information of the each of the four cameras satisfy a second set condition is judged. The second set condition is that the Euler angle information is within the first threshold range and the translation vector information is within the second threshold range.

If the Euler angle information and the translation vector information of the each of the four cameras satisfy the second set condition, the target extrinsic parameter of the each of the four cameras is determined to be successfully calibrated.

If the Euler angle information and the translation vector information of the each of the four cameras do not satisfy the second set condition, the target extrinsic parameter of the each camera fails to be calibrated.

In this embodiment, the Euler angle information may include a pitch angle $\alpha$, a yaw angle $\beta$, and a roll angle $\sigma$ of an camera. How to determine the Euler angle information and the translation vector information of the camera based on the target extrinsic parameter of the camera is not specifically limited herein. For example, the target extrinsic parameter of the camera may be identified and processed by a corresponding algorithm to obtain the Euler angle information and the translation vector information of the camera.

The first threshold range may be understood as a preset first threshold range. The second threshold range may be understood as a preset second threshold range. The first threshold range and the second threshold range are not specifically limited herein. For example, the first threshold range may be set to $0°<\alpha<90°$, $-90°<\beta<90°$, $-90°<\sigma<90°$.

Embodiment Three

Figure 5:
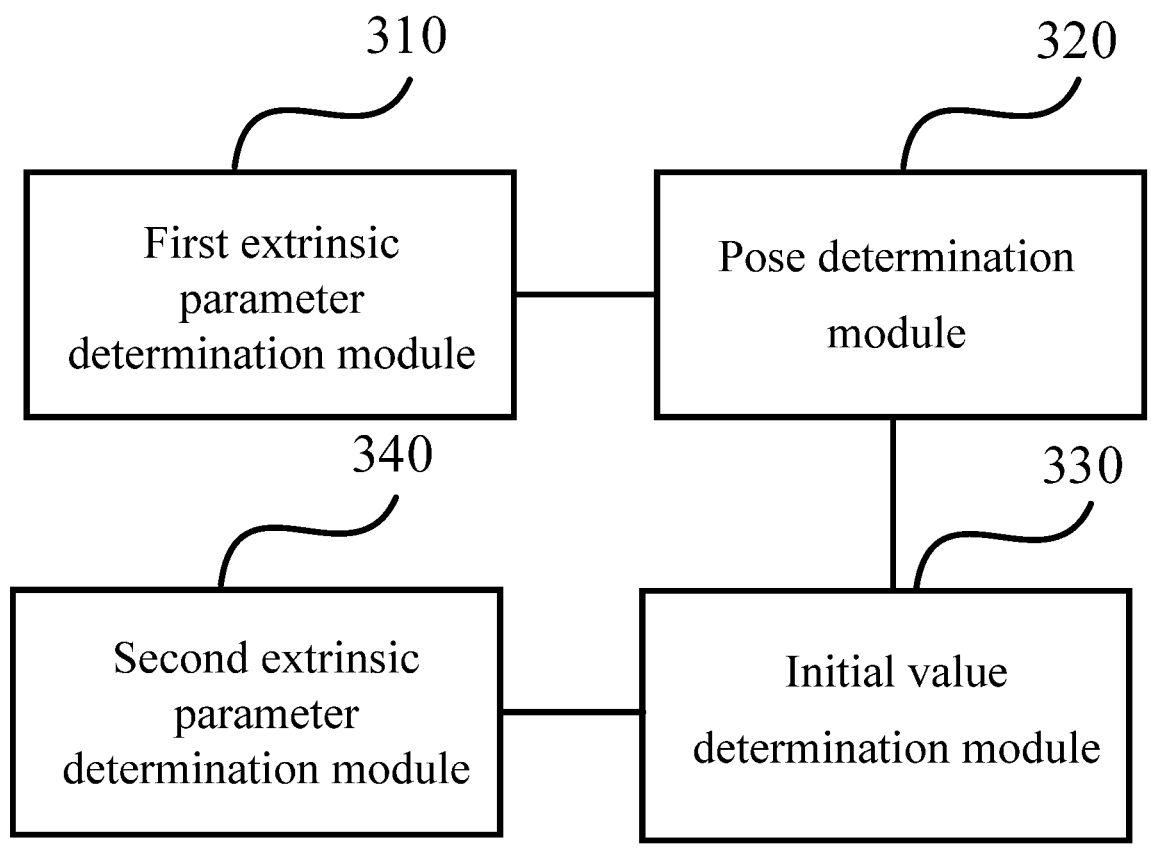
FIG. 5 is a structure diagram of an apparatus for calibrating extrinsic parameters of surround-view cameras on a vehicle according to embodiment three of the present disclosure.

FIG. 5 is a structure diagram of an apparatus for calibrating extrinsic parameters of surround-view cameras on a vehicle according to embodiment three of the present disclosure. The apparatus may be implemented by software and/or hardware. As shown in FIG. 5, the apparatus is disposed in a vehicle. The vehicle includes surround-view cameras on a vehicle including a first camera, a second camera, a third camera, and a fourth camera. The position of the first camera is adjacent to the position of the third camera and the position of the fourth camera, and the position of the second camera is adjacent to the position of the third camera and the position of the fourth camera. The apparatus includes: a first extrinsic parameter determination module 310, a pose determination module 320, an initial value determination module 330, and a second extrinsic parameter determination module 340.

The first extrinsic parameter determination module 310 is configured to determine an extrinsic parameter of the first camera and an extrinsic parameter of the second camera according to vehicle-body odometer information of the vehicle, first visual odometer information of the first camera, and second visual odometer information of the second camera.

The pose determination module 320 is configured to determine a first pose initial value, a second pose initial value, a third pose initial value, and a fourth pose initial value according to the vehicle-body odometer information, the first visual odometer information, the second visual odometer information, the extrinsic parameter of the first camera, and the extrinsic parameter of the second camera.

The initial value determination module 330 is configured to determine a first target pose initial value, a second target pose initial value, a third target pose initial value, and a fourth target pose initial value according to the first pose initial value, the second pose initial value, the third pose initial value, and the fourth pose initial value.

The second extrinsic parameter determination module 340 is configured to determine an extrinsic parameter of the third camera and an extrinsic parameter of the fourth camera according to the extrinsic parameter of the first camera, the extrinsic parameter of the second camera, the first target pose initial value, the second target pose initial value, the third target pose initial value, and the fourth target pose initial value.

In this embodiment, the first extrinsic parameter determination module determines the extrinsic parameter of the first camera and the extrinsic parameter of the second camera according to the vehicle-body odometer information of the vehicle, the first visual odometer information of the first camera, and the second visual odometer information of the second camera. The pose determination module determines the first pose initial value, the second pose initial value, the third pose initial value, and the fourth pose initial value according to the vehicle-body odometer information, the first visual odometer information, the second visual odometer information, the extrinsic parameter of the first camera, and the extrinsic parameter of the second camera. The initial value determination module determines the first target pose initial value, the second target pose initial value, the third target pose initial value, and the fourth target pose initial value according to the first pose initial value, the second pose initial value, the third pose initial value, and the fourth pose initial value. The second extrinsic parameter determination module determines the extrinsic parameter of the third camera and the extrinsic parameter of the fourth camera according to the extrinsic parameter of the first camera, the extrinsic parameter of the second camera, the first target pose initial value, the second target pose initial value, the third target pose initial value, and the fourth target pose initial value. In the solutions, according to the visual odometer information of the first camera and the second camera, the extrinsic parameter of the first camera and the extrinsic parameter of the second camera are first determined, and the extrinsic parameter of the third camera and the extrinsic parameter of the fourth camera are then determined according to the extrinsic parameter of the first camera and the extrinsic parameter of the second camera, avoiding the problems of large computing power and long-time consumption caused by performing, by each of the four cameras, visual odometer calculation to determine the extrinsic parameter, thereby improving the timeliness of the extrinsic parameter calibration. Moreover, the solutions can be applied to the extrinsic parameter calibration in any scenario and can avoid the problem of relying on specific road markers, improving the versatility of the extrinsic parameter calibration.

In an embodiment, the first extrinsic parameter determination module 310 includes: an image acquisition unit, an odometer determination unit, an extrinsic parameter determination unit, and an extrinsic parameter determination unit.

The image acquisition unit is configured to acquire the vehicle-body odometer information and images captured by the cameras.

The odometer determination unit is configured to determine the first visual odometer information and the second visual odometer information based on images captured by the first camera and the second camera.

The extrinsic parameter determination unit is configured to determine the extrinsic parameter of the first camera and the extrinsic parameter of the second camera by setting a hand-eye calibration algorithm based on the vehicle-body odometer information and the determined visual odometer information.

In an embodiment, the pose determination module 320 includes: a map points determination unit, a first conversion unit, a second conversion unit, an extrinsic parameter initial value determination unit, and a pose initial value determination unit.

The map points determination unit is configured to determine first effective map points, second effective map points, third effective map points, and fourth effective map points according to the vehicle-body odometer information, first map points in the first visual odometer information, second map points in the second visual odometer information, and capturing ranges of the first camera, the second camera, the third camera, and the fourth camera.

The first conversion unit is configured to according to the pose of the first visual odometer information and the pose of the second visual odometer information, convert the first effective map points and the second effective map points to coordinate points in a coordinate system of the first camera to obtain first coordinate points and second coordinate points, and convert the third effective map points and the fourth effective map points to coordinate points in a coordinate system of the second camera to obtain third coordinate points and fourth coordinate points.

The second conversion unit is configured to according to the extrinsic parameter of the first camera, and the extrinsic parameter of the second camera, convert the first coordinate points to coordinate points in a vehicle-body coordinate system to obtain first vehicle-body coordinate points, convert the second coordinate points to coordinate points in the vehicle-body coordinate system to obtain second vehicle-body coordinate points, convert the third coordinate points to coordinate points in the vehicle-body coordinate system to obtain third vehicle-body coordinate points, and convert the fourth coordinate points to coordinate points in the vehicle-body coordinate system to obtain fourth vehicle-body coordinate points.

The extrinsic parameter initial value determination unit is configured to determine a first target extrinsic parameter initial value and a second target extrinsic parameter initial value of the third camera, and a third target extrinsic parameter initial value and a fourth target extrinsic parameter initial value of the fourth camera according to the images captured by the first camera, the second camera, the third camera, and the fourth camera, the first vehicle-body coordinate points, the second vehicle-body coordinate points, the third vehicle-body coordinate points, and the fourth vehicle-body coordinate points.

The pose initial value determination unit is configured to determine the first pose initial value, the second pose initial value, the third pose initial value and the fourth pose initial value according to the first target extrinsic parameter initial value, the second target extrinsic parameter initial value, the third target extrinsic parameter initial value, the fourth target extrinsic parameter initial value, the extrinsic parameter of the first camera, and the extrinsic parameter of the second camera.

In an embodiment, the map points determination unit includes: a factor determination subunit, a conversion subunit, an area determination unit, and a map points determination subunit.

The factor determination subunit is configured to determine a scale factor based on vehicle-body motion trajectory information in the vehicle-body odometer information and camera motion trajectory information in the determined visual odometer information. The scale factor is a parameter representing the ratio of a real-world scale to a scale of a camera-constructed three-dimensional map.

The conversion subunit is configured to perform a ratio conversion on the first map points and the second map points based on the scale factor to obtain first real map points of the first map points at the real-world scale and second real map points of the second map points at the real-world map scale.

The area determination unit is configured to a first overlapping area, a second overlapping area, a third overlapping area, and a fourth overlapping area according to the capturing ranges of the first camera, the second camera, the third camera, and the fourth camera. The first overlapping area is the overlapping area between capturing ranges of the first camera and the third camera. The second overlapping area is the overlapping area between capturing ranges of the first camera and the fourth camera. The third overlapping area is the overlapping area between capturing ranges of the second camera and the third camera. The fourth overlapping area is the overlapping area between capturing ranges of the second camera and the fourth camera.

The map points determination subunit is configured to determine map points of the first real map points in the first overlapping area as the first effective map points, determine map points of the first real map points in the second overlapping area as the second effective map points, determine map points of the second real map points in the third overlapping area as the third effective map points, and determine map points of the second real map points in the fourth overlapping area as the fourth effective map points.

In an embodiment, the extrinsic parameter initial value determination unit includes: a feature points determination subunit, a first initial value determination subunit, an error determination subunit, and a second initial value determination subunit.

The feature points determination subunit is configured to determine the first target feature points, the second target feature points, the third target feature points and the fourth target feature points according to the images captured by the first camera, the second camera, the third camera, and the fourth camera. The first target feature points are corresponding feature points of the first vehicle-body coordinate points on an image of the third camera and obtained by feature point matching by the first camera and the third camera. The second target feature points are corresponding feature points of the second vehicle-body coordinate points on an image of the fourth camera and obtained by feature point matching by the first camera and the fourth camera. The third target feature points are corresponding feature points of the third vehicle-body coordinate points on the image of the third camera and obtained by feature point matching by the second camera and the third camera, and the fourth target feature points are corresponding feature points of the fourth vehicle-body coordinate points on the image of the fourth camera and obtained by feature point matching by the second camera and the fourth camera.

The first initial value determination subunit is configured to determine a first extrinsic parameter initial value and a second extrinsic parameter initial value of the third camera, and a third extrinsic parameter initial value and a fourth extrinsic parameter initial value of the fourth camera by a Perspective-n-Point (PNP) method according to the vehicle-body coordinate points and the target feature points.

The error determination subunit is configured to for each camera of the third camera and the fourth camera, for each value in a set area of the each camera, an extrinsic parameter initial value of the each camera is updated to the each value, project vehicle-body coordinate points corresponding to the each camera onto an image coordinate system of the each camera to obtain two-dimensional coordinate points corresponding to the each camera, and determine a photometric error between target feature points and the two-dimensional coordinate points corresponding to the each camera, where the set area is associated with the extrinsic parameter initial value of a camera corresponding to the set area.

The second initial value determination subunit is configured to determine a value corresponding to a minimum photometric error in photometric errors corresponding to the each camera as a target extrinsic parameter initial value corresponding to the each camera.

In an embodiment, the initial value determination module 330 includes: a first initial value determination unit.

The first initial value determination unit is configured to determine the first pose initial value, the second pose initial value, the third pose initial value, and the fourth pose initial value as the first target pose initial value, the second target pose initial value, the third target pose initial value, and the fourth target pose initial value.

In an embodiment, the initial value determination module 330 also includes: a second initial value determination unit.

The second initial value determination unit is configured to if a first photometric error value under the first pose initial value, a second photometric error value under the second pose initial value, a third photometric error value under the third pose initial value, and a fourth photometric error value under the fourth pose initial value do not satisfying a first set condition, update the pose initial values based on a first setting step size until the photometric error values under the updated pose initial values satisfy the first set condition, and determine the updated pose initial values as the target pose initial values.

The first photometric error value is an error value between a photometric value of first projection points and a photometric value of first target feature points. The first projection points are points obtained by projecting, under the first pose initial value, the first effective map points of the first camera to an image coordinate system of the third camera.

The second photometric error value is an error value between a photometric value of second projection points and a photometric value of second target feature points. The second projection points are points obtained by projecting, under the second pose initial value, the second effective map points of the first camera to an image coordinate system of the fourth camera.

The third photometric error value is an error value between a photometric value of third projection points and a photometric value of third target feature points. The third projection points are points obtained by projecting, under the third pose initial value, the third effective map points of the second camera to the image coordinate system of the third camera.

The fourth photometric error value is an error value between a photometric value of fourth projection points and a photometric value of fourth target feature points. The fourth projection points are points obtained by projecting, under the fourth pose initial value, the fourth effective map points of the second camera to the image coordinate system of the fourth camera.

The first set condition is that the first photometric error value reaches a first threshold, the second photometric error value reaches a second threshold, the third photometric error value reaches a third threshold, and the fourth photometric error value reaches a fourth threshold.

In an embodiment, the apparatus also includes an index determination module.

The index determination module is configured to after the extrinsic parameter of the third camera and the extrinsic parameter of the fourth camera are determined, under the extrinsic parameter of the above four cameras, determine an error index according to the following formula: $E_{rr}=E_1+E_2+E_3+E_4+E_5+E_6$.

$E_{rr}$ denotes the error index that is a parameter index for measuring the optimization of the extrinsic parameter of the four cameras. $E_1$ denotes a re-projection error value of first effective map points, of the first camera, projected onto an image coordinate system of the third camera. $E_2$ denotes a re-projection error value of third effective map points, of the second camera, projected onto the image coordinate system of the third camera. $E_3$ denotes a re-projection error value of second effective map points, of the first camera, projected onto an image coordinate system of the fourth camera. $E_4$ denotes a re-projection error value of fourth effective map points, of the second camera, projected onto the image coordinate system of the fourth camera. $E_5$ denotes a hand-eye calibration error value determined based on the vehicle-body odometer information and the first visual odometer information of the first camera. $E_6$ denotes a hand-eye calibration error value determined based on the vehicle-body odometer information and the second visual odometer information of the second camera. The third extrinsic parameter determination module is configured to if the error index reaches an error threshold, determine the extrinsic parameter of the each camera as a target extrinsic parameter of the each camera, where the target extrinsic parameter is an optimized extrinsic parameter.

A fourth extrinsic parameter determination module is configured to if the error index does not reach the error threshold, update the extrinsic parameter of at least one of the first camera, the second camera, the third camera, or the fourth camera based on a second setting step size until the error index reaches the error threshold, and determine the extrinsic parameters of the first camera, the second camera, the third camera, and the fourth camera when the error index reaches the error threshold as the target extrinsic parameters of the first camera, the second camera, the third camera, and the fourth camera.

In an embodiment, the apparatus also includes an information determination module, a judging module, a first calibration module, and a second calibration module.

The information determination module is configured to, after determining target extrinsic parameter of the each camera, for the each camera, determine Euler angle information and translation vector information of the each camera based on the target extrinsic parameter of the each camera. The Euler angle information is information representing the rotation angle of the each camera relative to the vehicle-body coordinate system, and the translation vector information is information representing the amount of translation of the each camera relative to the vehicle-body coordinate system.

The judging module is configured to judge whether the Euler angle information and the translation vector information of the each camera satisfy a second set condition. The second set condition is that the Euler angle information is within a first threshold range and the translation vector information is within a second threshold range.

The first calibration module is configured to if the Euler angle information and the translation vector information of the each camera satisfy the second set condition, determine that the target extrinsic parameter of the each camera is successfully calibrated.

The second calibration module is configured to if the Euler angle information and the translation vector information of the each camera do not satisfy the second set condition, determine that the target extrinsic parameter of the each camera fails to be calibrated.

The apparatus for calibrating extrinsic parameters of surround-view cameras on a vehicle provided by the embodiment of the present disclosure can execute the method for calibrating extrinsic parameters of surround-view cameras on a vehicle provided by any embodiment of the present disclosure, and has function modules and beneficial effects corresponding to this method.

Embodiment Four

Figure 6:
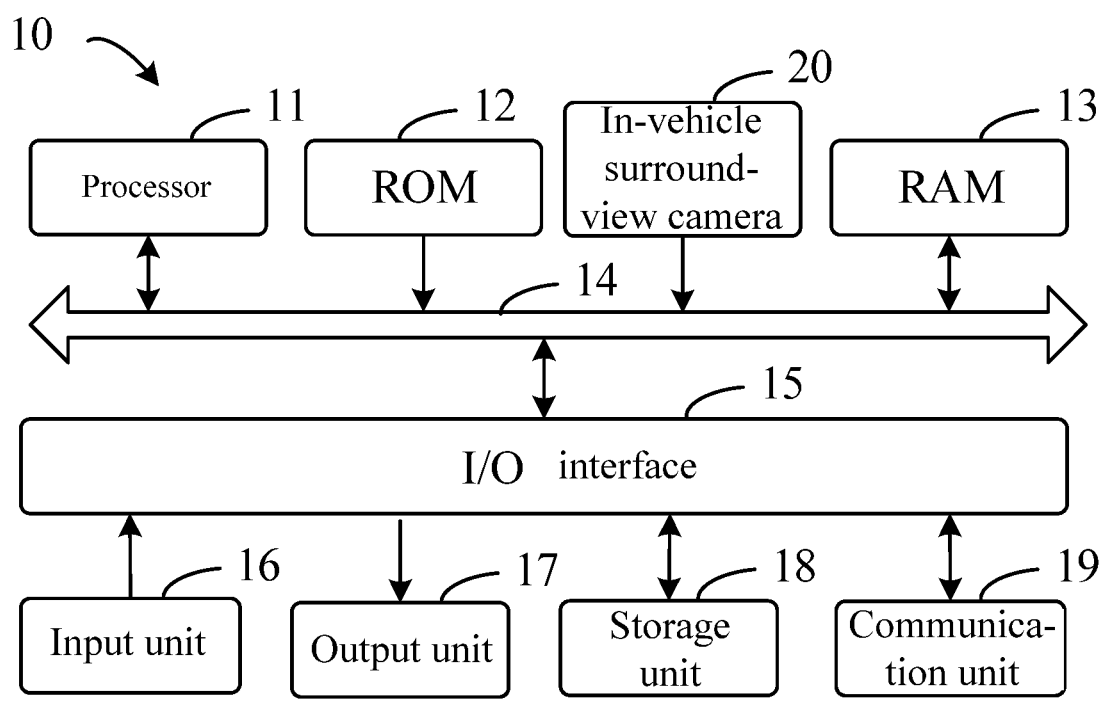
FIG. 6 is a structure diagram of a vehicle according to embodiment four of the present disclosure.

FIG. 6 is a structure diagram of a vehicle according to embodiment four of the present disclosure. As shown in FIG. 6, the vehicle 10 includes surround-view cameras 20, at least one processor 11, and a memory, such as a read-only memory (ROM) 12, a random access memory (RAM) 13, and the like, communicatively connected to the at least one processor 11, where the memory is configured to store computer programs executable by the at least one processor, and the at least one processor 11 may perform various appropriate actions and processing according to the computer programs stored in the read-only memory (ROM) 1102 or the computer programs loaded into the random-access memory (RAM) 1103 from a storage unit 1108. Various programs and data required for operations of the vehicle 10 may also be stored in the RAM 13. The surround-view cameras 20, the at least one processor 11, the ROM 12, and the RAM 13 are connected to each other via a bus 14. An input/output (I/O) interface 15 is also connected to the bus 14.

Multiple components in the vehicle 10 are connected to the I/O interface 15. The multiple components include an input unit 16 such as a keyboard and a mouse, an output unit 17 such as various types of displays and speakers, the storage unit 18 such as a magnetic disk and an optical disk, and a communication unit 19 such as a network card, a modem, and a wireless communication transceiver. The communication unit 19 allows the vehicle 10 to exchange information/data with other devices over a computer network such as the Internet and/or over various telecommunication networks.

The processor 11 may be one of various general-purpose and/or special-purpose processing components having processing and computing capabilities. Examples of the processor 11 include, but are not limited to, central processing units (CPUs), graphics processing units (GPUs), various dedicated artificial intelligence (AI) computing chips, various processors executing machine learning models and algorithms, digital signal processors (DSPs) and any appropriate processor, controller and microcontroller. The processor 11 executes various methods and processing described above, such as the method for calibrating extrinsic parameters of the surround-view cameras on a vehicle.

In some embodiments, the method for calibrating extrinsic parameters of the surround-view cameras on a vehicle may be implemented as computer software programs tangibly contained in a computer-readable medium such as the storage unit 18. In some embodiments, part or all of computer programs may be loaded and/or installed on the vehicle 10 via the ROM 12 and/or the communication unit 19. When the computer programs are loaded to the RAM 13 and executed by the processor 11, one or more steps of the method for calibrating extrinsic parameters of the surround-view cameras on a vehicle described above may be performed. Alternatively, in other embodiments, the processor 11 may be configured, in any other suitable manner (for example, by means of firmware), to perform the method for calibrating extrinsic parameters of the surround-view cameras on a vehicle may be performed.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The at least one programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

Computer programs for implementation of the method of the present disclosure may be written in any combination of one or more programming languages. These computer programs may be provided for the processor or controller of a general-purpose computer, a special-purpose computer or another programmable data processing apparatus to cause functions/operations specified in flowcharts and/or block diagrams to be implemented when the computer programs are executed by the processor. Computer programs may be executed entirely on a machine, partly on a machine, as a stand-alone software package, partly on a machine and partly on a remote machine, or entirely on a remote machine or a server.

In the context of the present disclosure, a computer-readable storage medium may be a tangible medium that may include or store computer programs that are used by or in conjunction with a system, apparatus or device that executes instructions. The computer-readable storage medium may include, but is not limited to, an electronic, magnetic, optical, electromagnetic, infrared or semiconductor system, apparatus or device or any suitable combination thereof. The computer-readable storage medium may be a non-transitory computer-readable storage medium. Alternatively, the computer-readable storage medium may be a machine-readable signal medium. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a vehicle. The vehicle has a display device (for example, a cathode-ray tube (CRT) or a liquid-crystal display (LCD) monitor) for displaying information to the user and a keyboard and a pointing apparatus (for example, a mouse or a trackball) through which the user can provide input to the vehicle. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services.

It is to be understood that various forms of the preceding flows may be used with steps reordered, added or removed. For example, the steps described in the present disclosure may be executed in parallel, in sequence, or in a different order as long as the desired results of the technical solutions disclosed in the present disclosure are achieved. The execution sequence of these steps is not limited herein.

The scope of the present disclosure is not limited to the preceding embodiments. It is to be understood by those skilled in the art that various modifications, combinations, sub-combinations and substitutions may be made according to design requirements and other factors.

What is claimed is:

1. A method for calibrating extrinsic parameters of surround-view cameras on a vehicle, applied by the vehicle, wherein the surround-view cameras comprise a first camera, a second camera, a third camera, and a fourth camera, and wherein a position of the first camera is adjacent to a position of the third camera and a position of the fourth camera, and a position of the second camera is adjacent to the position of the third camera and the position of the fourth camera, and the method comprising:

determining an extrinsic parameter of the first camera and an extrinsic parameter of the second camera according to vehicle-body odometer information of the vehicle, first visual odometer information of the first camera, and second visual odometer information of the second camera;

determining a first pose initial value, a second pose initial value, a third pose initial value, and a fourth pose initial value according to the vehicle-body odometer information, the first visual odometer information, the second visual odometer information, the extrinsic parameter of the first camera, and the extrinsic parameter of the second camera;

determining a first target pose initial value, a second target pose initial value, a third target pose initial value, and a fourth target pose initial value according to the first pose initial value, the second pose initial value, the third pose initial value, and the fourth pose initial value; and determining an extrinsic parameter of the third camera and an extrinsic parameter of the fourth camera according to the extrinsic parameter of the first camera, the extrinsic parameter of the second camera, the first target pose initial value, the second target pose initial value, the third target pose initial value, and the fourth target pose initial value.

2. The method of claim 1, wherein the determining a first pose initial value, a second pose initial value, a third pose initial value, and a fourth pose initial value according to the vehicle-body odometer information, the first visual odometer information, the second visual odometer information, the extrinsic parameter of the first camera, and the extrinsic parameter of the second camera comprises:

determining first effective map points, second effective map points, third effective map points, and fourth effective map points according to the vehicle-body odometer information, first map points in the first visual odometer information, second map points in the second visual odometer information, and capturing ranges of the first camera, the second camera, the third camera, and the fourth camera;

according to a pose of the first visual odometer information and a pose of the second visual odometer information, converting the first effective map points and the second effective map points to coordinate points in a coordinate system of the first camera to obtain first coordinate points and second coordinate points, and converting the third effective map points and the fourth effective map points to coordinate points in a coordinate system of the second camera to obtain third coordinate points and fourth coordinate points;

according to the extrinsic parameter of the first camera, and the extrinsic parameter of the second camera, converting the first coordinate points to coordinate points in a vehicle-body coordinate system to obtain first vehicle-body coordinate points, converting the second coordinate points to coordinate points in the vehicle-body coordinate system to obtain second vehicle-body coordinate points, converting the third coordinate points to coordinate points in the vehicle-body coordinate system to obtain third vehicle-body coordinate points, and converting the fourth coordinate points to coordinate points in the vehicle-body coordinate system to obtain fourth vehicle-body coordinate points;

determining a first target extrinsic parameter initial value and a second target extrinsic parameter initial value of the third camera, and a third target extrinsic parameter initial value and a fourth target extrinsic parameter initial value of the fourth camera according to images captured by the first camera, the second camera, the third camera, and the fourth camera, the first vehicle-body coordinate points, the second vehicle-body coordinate points, the third vehicle-body coordinate points, and the fourth vehicle-body coordinate points; and determining the first pose initial value, the second pose initial value, the third pose initial value, and the fourth pose initial value according to the first target extrinsic parameter initial value, the second target extrinsic parameter initial value, the third target extrinsic parameter initial value, the fourth target extrinsic parameter initial value, the extrinsic parameter of the first camera, and the extrinsic parameter of the second camera.

3. The method of claim 1, wherein the determining a first target pose initial value, a second target pose initial value, a third target pose initial value, and a fourth target pose initial value according to the first pose initial value, the second pose initial value, the third pose initial value, and the fourth pose initial value comprises:

determining the first pose initial value, the second pose initial value, the third pose initial value, and the fourth pose initial value as the first target pose initial value, the second target pose initial value, the third target pose initial value, and the fourth target pose initial value.

4. The method of claim 2, wherein the determining a first target pose initial value, a second target pose initial value, a third target pose initial value, and a fourth target pose initial value according to the first pose initial value, the second pose initial value, the third pose initial value, and the fourth pose initial value comprises:

in response to a first photometric error value under the first pose initial value, a second photometric error value under the second pose initial value, a third photometric error value under the third pose initial value, and a fourth photometric error value under the fourth pose initial value not satisfying a first set condition, updating the first pose initial value, the second pose initial value, the third pose initial value, and the fourth pose initial value based on a first setting step size until the first photometric error value under updated first pose initial value, the second photometric error value under updated second pose initial value, the third photometric error value under updated third pose initial value, and the fourth photometric error value under updated fourth pose initial value satisfy the first set condition, and determining the updated first pose initial value, the updated second pose initial value, the updated third pose initial value, and the updated fourth pose initial value as the first target pose initial value, the second target pose initial value, the third target pose initial value and the fourth target pose initial value, respectively, wherein the first photometric error value is an error value between a photometric value of first projection points and a photometric value of first target feature points, and the first projection points are points obtained by projecting, under the first pose initial value, the first effective map points of the first camera to an image coordinate system of the third camera;

the second photometric error value is an error value between a photometric value of second projection points and a photometric value of second target feature points, and the second projection points are points obtained by projecting, under the second pose initial value, the second effective map points of the first camera to an image coordinate system of the fourth camera;

the third photometric error value is an error value between a photometric value of third projection points and a photometric value of third target feature points, and the third projection points are points obtained by projecting, under the third pose initial value, the third effective map points of the second camera to the image coordinate system of the third camera;

the fourth photometric error value is an error value between a photometric value of fourth projection points and a photometric value of fourth target feature points, and the fourth projection points are points obtained by projecting, under the fourth pose initial value, the fourth effective map points of the second camera to the image coordinate system of the fourth camera; and the first set condition is that the first photometric error value reaches a first threshold, the second photometric error value reaches a second threshold, the third photometric error value reaches a third threshold, and the fourth photometric error value reaches a fourth threshold.

5. The method of claim 2, wherein the determining first effective map points, second effective map points, third effective map points, and fourth effective map points according to the vehicle-body odometer information, first map points in the first visual odometer information, second map points in the second visual odometer information, and capturing ranges of the first camera, the second camera, the third camera, and the fourth camera comprises:

determining a scale factor based on vehicle-body motion trajectory information in vehicle-body odometer information and camera motion trajectory information in determined visual odometer information, wherein the scale factor is a parameter representing a ratio of a real-world scale to a scale of a camera-constructed three-dimensional map;

performing a ratio conversion on the first map points and the second map points based on the scale factor to obtain first real map points of the first map points at the real-world scale and second real map points of the second map points at the real-world map scale;

determining a first overlapping area, a second overlapping area, a third overlapping area, and a fourth overlapping area according to the capturing ranges of the first camera, the second camera, the third camera, and the fourth camera, wherein the first overlapping area is an overlapping area between capturing ranges of the first camera and the third camera, the second overlapping area is an overlapping area between capturing ranges of the first camera and the fourth camera, the third overlapping area is an overlapping area between capturing ranges of the second camera and the third camera, and the fourth overlapping area is an overlapping area between capturing ranges of the second camera and the fourth camera; and determining map points of the first real map points in the first overlapping area as the first effective map points, determining map points of the first real map points in the second overlapping area as the second effective map points, determining map points of the second real map points in the third overlapping area as the third effective map points, and determining map points of the second real map points in the fourth overlapping area as the fourth effective map points.

6. The method of claim 2, wherein the determining a first target extrinsic parameter initial value and a second target extrinsic parameter initial value of the third camera, and a third target extrinsic parameter initial value and a fourth target extrinsic parameter initial value of the fourth camera according to images captured by the first camera, the second camera, the third camera, and the fourth camera, the first vehicle-body coordinate points, the second vehicle-body coordinate points, the third vehicle-body coordinate points, and the fourth vehicle-body coordinate points comprises:

determining first target feature points, second target feature points, third target feature points and fourth target feature points according to the images captured by the first camera, the second camera, the third camera, and the fourth camera, wherein the first target feature points are corresponding feature points of the first vehicle-body coordinate points on an image of the third camera and obtained by feature point matching by the first camera and the third camera, the second target feature points are corresponding feature points of the second vehicle-body coordinate points on an image of the fourth camera and obtained by feature point matching by the first camera and the fourth camera, the third target feature points are corresponding feature points of the third vehicle-body coordinate points on the image of the third camera and obtained by feature point matching by the second camera and the third camera, and the fourth target feature points are corresponding feature points of the fourth vehicle-body coordinate points on the image of the fourth camera and obtained by feature point matching by the second camera and the fourth camera;

determining a first extrinsic parameter initial value and a second extrinsic parameter initial value of the third camera, and a third extrinsic parameter initial value and a fourth extrinsic parameter initial value of the fourth camera by a Perspective-n-Point (PNP) method according to the first vehicle-body coordinate points, the second vehicle-body coordinate points, the third vehicle-body coordinate points, the fourth vehicle-body coordinate points, the first target feature points, the second target feature points, the third target feature points, and the fourth target feature points;

for each camera of the third camera and the fourth camera, for each value in a set area of the each camera, updating an extrinsic parameter initial value of the each camera to the each value, projecting vehicle-body coordinate points corresponding to the each camera onto an image coordinate system of the each camera to obtain two-dimensional coordinate points corresponding to the each camera, and determining a photometric error between target feature points and the two-dimensional coordinate points corresponding to the each camera, wherein the set area is associated with an extrinsic parameter initial value of a camera corresponding to the set area; and determining a value corresponding to a minimum photometric error in photometric errors corresponding to the each camera as a target extrinsic parameter initial value corresponding to the each camera.

7. The method of claim 1, after the determining the extrinsic parameter of the third camera and the extrinsic parameter of the fourth camera according to the extrinsic parameter of the first camera, the extrinsic parameter of the second camera, the first target pose initial value, the second target pose initial value, the third target pose initial value, and the fourth target pose initial value, further comprising:

under the extrinsic parameters of the first camera, the second camera, the third camera, and the fourth camera, determining an error index according to the following formula:

$$E_{rr} = E_1 + E_2 + E_3 + E_4 + E_5 + E_6,$$

wherein $E_{rr}$ denotes the error index that is a parameter index for measuring optimization of the extrinsic parameters of the first camera, the second camera, the third camera, and the fourth camera; $E_1$ denotes a re-projection error value of first effective map points, of the first camera, projected onto an image coordinate system of the third camera; $E_2$ denotes a re-projection error value of third effective map points, of the second camera, projected onto the image coordinate system of the third camera; $E_3$ denotes a re-projection error value of second effective map points, of the first camera, projected onto an image coordinate system of the fourth camera; $E_4$ denotes a re-projection error value of fourth effective map points, of the second camera, projected onto the image coordinate system of the fourth camera; $E_5$ denotes a hand-eye calibration error value determined based on the vehicle-body odometer information and the first visual odometer information of the first camera; and $E_6$ denotes a hand-eye calibration error value determined based on the vehicle-body odometer information and the second visual odometer information of the second camera;

in response to the error index reaching an error threshold, determining the extrinsic parameters of the first camera, the second camera, the third camera, and the fourth camera as target extrinsic parameters of the first camera, the second camera, the third camera, and the fourth camera, wherein the target extrinsic parameters are optimized extrinsic parameters; and in response to the error index not reaching the error threshold, updating an extrinsic parameter of at least one of the first camera, the second camera, the third camera, or the fourth camera based on a second setting step size until the error index reaches the error threshold, and determining the extrinsic parameters of the first camera, the second camera, the third camera, and the fourth camera, when the error index reaches the error threshold, as the target extrinsic parameters of the first camera, the second camera, the third camera, and the fourth camera.

8. The method of claim 7, after determining the target extrinsic parameters of the first camera, the second camera, the third camera, and the fourth camera, further comprising:

for each camera of the first camera, the second camera, the third camera, and the fourth camera, determining Euler angle information and translation vector information of the each camera based on a target extrinsic parameter of the each camera, wherein the Euler angle information is information representing a rotation angle of the each camera relative to the vehicle-body coordinate system, and the translation vector information is information representing an amount of translation of the each camera relative to the vehicle-body coordinate system; and judging whether the Euler angle information and the translation vector information of the each camera satisfy a second set condition, wherein the second set condition is that the Euler angle information is within a first threshold range and the translation vector information is within a second threshold range; and in response to determining that the Euler angle information and the translation vector information of the each camera satisfy the second set condition, determining that the target extrinsic parameter of the each camera is successfully calibrated;

in response to determining that the Euler angle information and the translation vector information of the each camera do not satisfy the second set condition, determining that the target extrinsic parameter of the each camera fails to be calibrated.

9. An apparatus for calibrating extrinsic parameters of surround-view cameras on a vehicle, disposed on the vehicle, wherein the surround-view cameras comprise a first camera, a second camera, a third camera, and a fourth camera, and wherein a position of the first camera is adjacent to a position of the third camera and a position of the fourth camera, and a position of the second camera is adjacent to the position of the third camera and the position of the fourth camera, and the apparatus comprising:

a first extrinsic parameter determination module, configured to determine an extrinsic parameter of the first camera and an extrinsic parameter of the second camera according to vehicle-body odometer information of the vehicle, first visual odometer information of the first camera, and second visual odometer information of the second camera;

a pose determination module, configured to determine a first pose initial value, a second pose initial value, a third pose initial value, and a fourth pose initial value according to the vehicle-body odometer information, the first visual odometer information, the second visual odometer information, the extrinsic parameter of the first camera, and the extrinsic parameter of the second camera;

an initial value determination module, configured to determine a first target pose initial value, a second target pose initial value, a third target pose initial value, and a fourth target pose initial value according to the first pose initial value, the second pose initial value, the third pose initial value, and the fourth pose initial value; and a second extrinsic parameter determination module, configured to determine an extrinsic parameter of the third camera and an extrinsic parameter of the fourth camera according to the extrinsic parameter of the first camera, the extrinsic parameter of the second camera, the first target pose initial value, the second target pose initial value, the third target pose initial value, and the fourth target pose initial value.

10. A vehicle, comprising:

surround-view cameras, comprising a first camera, a second camera, a third camera, and a fourth camera, wherein a position of the first camera is adjacent to a position of the third camera and a position of the fourth camera, and a position of the second camera is adjacent to the position of the third camera and the position of the fourth camera;

at least one processor; and a memory communicatively connected to the at least one processor, wherein the memory is configured to store computer programs executable by the at least one processor, and the computer programs, when executed by the at least one processor, enable the at least one processor to execute a method for calibrating extrinsic parameters of the surround-view cameras on the vehicle, comprising:

determining an extrinsic parameter of the first camera and an extrinsic parameter of the second camera according to vehicle-body odometer information of the vehicle, first visual odometer information of the first camera, and second visual odometer information of the second camera;

determining a first pose initial value, a second pose initial value, a third pose initial value, and a fourth pose initial value according to the vehicle-body odometer information, the first visual odometer information, the second visual odometer information, the extrinsic parameter of the first camera, and the extrinsic parameter of the second camera;

determining a first target pose initial value, a second target pose initial value, a third target pose initial value, and a fourth target pose initial value according to the first pose initial value, the second pose initial value, the third pose initial value, and the fourth pose initial value; and determining an extrinsic parameter of the third camera and an extrinsic parameter of the fourth camera according to the extrinsic parameter of the first camera, the extrinsic parameter of the second camera, the first target pose initial value, the second target pose initial value, the third target pose initial value, and the fourth target pose initial value.

11. The vehicle of claim 10, wherein the determining a first pose initial value, a second pose initial value, a third pose initial value, and a fourth pose initial value according to the vehicle-body odometer information, the first visual odometer information, the second visual odometer information, the extrinsic parameter of the first camera, and the extrinsic parameter of the second camera comprises:

determining first effective map points, second effective map points, third effective map points, and fourth effective map points according to the vehicle-body odometer information, first map points in the first visual odometer information, second map points in the second visual odometer information, and capturing ranges of the first camera, the second camera, the third camera, and the fourth camera;

according to a pose of the first visual odometer information and a pose of the second visual odometer information, converting the first effective map points and the second effective map points to coordinate points in a coordinate system of the first camera to obtain first coordinate points and second coordinate points, and converting the third effective map points and the fourth effective map points to coordinate points in a coordinate system of the second camera to obtain third coordinate points and fourth coordinate points;

according to the extrinsic parameter of the first camera, and the extrinsic parameter of the second camera, converting the first coordinate points to coordinate points in a vehicle-body coordinate system to obtain first vehicle-body coordinate points, converting the second coordinate points to coordinate points in the vehicle-body coordinate system to obtain second vehicle-body coordinate points, converting the third coordinate points to coordinate points in the vehicle-body coordinate system to obtain third vehicle-body coordinate points, and converting the fourth coordinate points to coordinate points in the vehicle-body coordinate system to obtain fourth vehicle-body coordinate points;

determining a first target extrinsic parameter initial value and a second target extrinsic parameter initial value of the third camera, and a third target extrinsic parameter initial value and a fourth target extrinsic parameter initial value of the fourth camera according to images captured by the first camera, the second camera, the third camera, and the fourth camera, the first vehicle-body coordinate points, the second vehicle-body coordinate points, the third vehicle-body coordinate points, and the fourth vehicle-body coordinate points; and determining the first pose initial value, the second pose initial value, the third pose initial value, and the fourth pose initial value according to the first target extrinsic parameter initial value, the second target extrinsic parameter initial value, the third target extrinsic parameter initial value, the fourth target extrinsic parameter initial value, the extrinsic parameter of the first camera, and the extrinsic parameter of the second camera.

12. The method of claim 10, wherein the determining a first target pose initial value, a second target pose initial value, a third target pose initial value, and a fourth target pose initial value according to the first pose initial value, the second pose initial value, the third pose initial value, and the fourth pose initial value comprises:

determining the first pose initial value, the second pose initial value, the third pose initial value, and the fourth pose initial value as the first target pose initial value, the second target pose initial value, the third target pose initial value, and the fourth target pose initial value.

13. The method of claim 11, wherein the determining a first target pose initial value, a second target pose initial value, a third target pose initial value, and a fourth target pose initial value according to the first pose initial value, the second pose initial value, the third pose initial value, and the fourth pose initial value comprises:

in response to a first photometric error value under the first pose initial value, a second photometric error value under the second pose initial value, a third photometric error value under the third pose initial value, and a fourth photometric error value under the fourth pose initial value not satisfying a first set condition, updating the first pose initial value, the second pose initial value, the third pose initial value, and the fourth pose initial value based on a first setting step size until the first photometric error value under updated first pose initial value, the second photometric error value under updated second pose initial value, the third photometric error value under updated third pose initial value, and the fourth photometric error value under updated fourth pose initial value satisfy the first set condition, and determining the updated first pose initial value, the updated second pose initial value, the updated third pose initial value, and the updated fourth pose initial value as the first target pose initial value, the second target pose initial value, the third target pose initial value and the fourth target pose initial value, respectively, wherein the first photometric error value is an error value between a photometric value of first projection points and a photometric value of first target feature points, and the first projection points are points obtained by projecting, under the first pose initial value, the first effective map points of the first camera to an image coordinate system of the third camera;

the second photometric error value is an error value between a photometric value of second projection points and a photometric value of second target feature points, and the second projection points are points obtained by projecting, under the second pose initial value, the second effective map points of the first camera to an image coordinate system of the fourth camera;

the third photometric error value is an error value between a photometric value of third projection points and a photometric value of third target feature points, and the third projection points are points obtained by projecting, under the third pose initial value, the third effective map points of the second camera to the image coordinate system of the third camera;

the fourth photometric error value is an error value between a photometric value of fourth projection points and a photometric value of fourth target feature points, and the fourth projection points are points obtained by projecting, under the fourth pose initial value, the fourth effective map points of the second camera to the image coordinate system of the fourth camera; and the first set condition is that the first photometric error value reaches a first threshold, the second photometric error value reaches a second threshold, the third photometric error value reaches a third threshold, and the fourth photometric error value reaches a fourth threshold.

14. The method of claim 11, wherein the determining first effective map points, second effective map points, third effective map points, and fourth effective map points according to the vehicle-body odometer information, first map points in the first visual odometer information, second map points in the second visual odometer information, and capturing ranges of the first camera, the second camera, the third camera, and the fourth camera comprises:

determining a scale factor based on vehicle-body motion trajectory information in vehicle-body odometer information and camera motion trajectory information in determined visual odometer information, wherein the scale factor is a parameter representing a ratio of a real-world scale to a scale of a camera-constructed three-dimensional map;

performing a ratio conversion on the first map points and the second map points based on the scale factor to obtain first real map points of the first map points at the real-world scale and second real map points of the second map points at the real-world map scale;

determining a first overlapping area, a second overlapping area, a third overlapping area, and a fourth overlapping area according to the capturing ranges of the first camera, the second camera, the third camera, and the fourth camera, wherein the first overlapping area is an overlapping area between capturing ranges of the first camera and the third camera, the second overlapping area is an overlapping area between capturing ranges of the first camera and the fourth camera, the third overlapping area is an overlapping area between capturing ranges of the second camera and the third camera, and the fourth overlapping area is an overlapping area between capturing ranges of the second camera and the fourth camera; and determining map points of the first real map points in the first overlapping area as the first effective map points, determining map points of the first real map points in the second overlapping area as the second effective map points, determining map points of the second real map points in the third overlapping area as the third effective map points, and determining map points of the second real map points in the fourth overlapping area as the fourth effective map points.

15. The method of claim 11, wherein the determining a first target extrinsic parameter initial value and a second target extrinsic parameter initial value of the third camera, and a third target extrinsic parameter initial value and a fourth target extrinsic parameter initial value of the fourth camera according to images captured by the first camera, the second camera, the third camera, and the fourth camera, the first vehicle-body coordinate points, the second vehicle-body coordinate points, the third vehicle-body coordinate points, and the fourth vehicle-body coordinate points comprises:

determining first target feature points, second target feature points, third target feature points and fourth target feature points according to the images captured by the first camera, the second camera, the third camera, and the fourth camera, wherein the first target feature points are corresponding feature points of the first vehicle-body coordinate points on an image of the third camera and obtained by feature point matching by the first camera and the third camera, the second target feature points are corresponding feature points of the second vehicle-body coordinate points on an image of the fourth camera and obtained by feature point matching by the first camera and the fourth camera, the third target feature points are corresponding feature points of the third vehicle-body coordinate points on the image of the third camera and obtained by feature point matching by the second camera and the third camera, and the fourth target feature points are corresponding feature points of the fourth vehicle-body coordinate points on the image of the fourth camera and obtained by feature point matching by the second camera and the fourth camera;

determining a first extrinsic parameter initial value and a second extrinsic parameter initial value of the third camera, and a third extrinsic parameter initial value and a fourth extrinsic parameter initial value of the fourth camera by a Perspective-n-Point (PNP) method according to the first vehicle-body coordinate points, the second vehicle-body coordinate points, the third vehicle-body coordinate points, the fourth vehicle-body coordinate points, the first target feature points, the second target feature points, the third target feature points, and the fourth target feature points;

for each camera of the third camera and the fourth camera, for each value in a set area of the each camera, updating an extrinsic parameter initial value of the each camera to the each value, projecting vehicle-body coordinate points corresponding to the each camera onto an image coordinate system of the each camera to obtain two-dimensional coordinate points corresponding to the each camera, and determining a photometric error between target feature points and the two-dimensional coordinate points corresponding to the each camera, wherein the set area is associated with an extrinsic parameter initial value of a camera corresponding to the set area; and determining a value corresponding to a minimum photometric error in photometric errors corresponding to the each camera as a target extrinsic parameter initial value corresponding to the each camera.

16. The method of claim 10, after the determining the extrinsic parameter of the third camera and the extrinsic parameter of the fourth camera according to the extrinsic parameter of the first camera, the extrinsic parameter of the second camera, the first target pose initial value, the second target pose initial value, the third target pose initial value, and the fourth target pose initial value, further comprising:

under the extrinsic parameters of the first camera, the second camera, the third camera, and the fourth camera, determining an error index according to the following formula:

$$E_{rr} = E_1 + E_2 + E_3 + E_4 + E_5 + E_6,$$

wherein $E_{rr}$ denotes the error index that is a parameter index for measuring optimization of the extrinsic parameters of the first camera, the second camera, the third camera, and the fourth camera; $E_1$ denotes a re-projection error value of first effective map points, of the first camera, projected onto an image coordinate system of the third camera; $E_2$ denotes a re-projection error value of third effective map points, of the second camera, projected onto the image coordinate system of the third camera; $E_3$ denotes a re-projection error value of second effective map points, of the first camera, projected onto an image coordinate system of the fourth camera; $E_4$ denotes a re-projection error value of fourth effective map points, of the second camera, projected onto the image coordinate system of the fourth camera; $E_5$ denotes a hand-eye calibration error value determined based on the vehicle-body odometer information and the first visual odometer information of the first camera; and $E_6$ denotes a hand-eye calibration error value determined based on the vehicle-body odometer information and the second visual odometer information of the second camera;

in response to the error index reaching an error threshold, determining the extrinsic parameters of the first camera, the second camera, the third camera, and the fourth camera as target extrinsic parameters of the first camera, the second camera, the third camera, and the fourth camera, wherein the target extrinsic parameters are optimized extrinsic parameters; and in response to the error index not reaching the error threshold, updating an extrinsic parameter of at least one of the first camera, the second camera, the third camera, or the fourth camera based on a second setting step size until the error index reaches the error threshold, and determining the extrinsic parameters of the first camera, the second camera, the third camera, and the fourth camera, when the error index reaches the error threshold, as the target extrinsic parameters of the first camera, the second camera, the third camera, and the fourth camera.

17. The method of claim 16, after determining the target extrinsic parameters of the first camera, the second camera, the third camera, and the fourth camera, further comprising:

for each camera of the first camera, the second camera, the third camera, and the fourth camera, determining Euler angle information and translation vector information of the each camera based on a target extrinsic parameter of the each camera, wherein the Euler angle information is information representing a rotation angle of the each camera relative to the vehicle-body coordinate system, and the translation vector information is information representing an amount of translation of the each camera relative to the vehicle-body coordinate system; and judging whether the Euler angle information and the translation vector information of the each camera satisfy a second set condition, wherein the second set condition is that the Euler angle information is within a first threshold range and the translation vector information is within a second threshold range; and in response to determining that the Euler angle information and the translation vector information of the each camera satisfy the second set condition, determining that the target extrinsic parameter of the each camera is successfully calibrated;

in response to determining that the Euler angle information and the translation vector information of the each camera do not satisfy the second set condition, determining that the target extrinsic parameter of the each camera fails to be calibrated.

18. A non-transitory computer-readable storage medium, storing a computer instruction for causing a processor to, when executed, implement the method for calibrating extrinsic parameters of surround-view cameras on a vehicle of claim 1.

19. A non-transitory computer-readable storage medium, storing a computer instruction for causing a processor to, when executed, implement the method for calibrating extrinsic parameters of surround-view cameras on a vehicle of claim 2.

20. A non-transitory computer-readable storage medium, storing a computer instruction for causing a processor to, when executed, implement the method for calibrating extrinsic parameters of surround-view cameras on a vehicle of claim 3.

* * * * *